United States Patent
Nair et al.

(10) Patent No.: US 11,736,559 B2
(45) Date of Patent: Aug. 22, 2023

(54) PROVIDING A SET OF APPLICATION SLICES WITHIN AN APPLICATION ENVIRONMENT

(71) Applicant: Avesha, Inc., Bedford, MA (US)

(72) Inventors: Raj Nair, Lexington, MA (US); Prabhudev Navali, Westford, MA (US); Sudhir Halbhavi, Bangalore (IN); Chin-Cheng Wu, Carlisle, MA (US)

(73) Assignee: Avesha, Inc., Chelmsford, MA (US)

( * ) Notice: Subject to any disclaimer, the term of this patent is extended or adjusted under 35 U.S.C. 154(b) by 0 days.

(21) Appl. No.: 17/394,785

(22) Filed: Aug. 5, 2021

(65) Prior Publication Data
US 2022/0046084 A1 Feb. 10, 2022

Related U.S. Application Data

(60) Provisional application No. 63/183,244, filed on May 3, 2021, provisional application No. 63/061,364, filed on Aug. 5, 2020.

(51) Int. Cl.
*H04L 67/1001* (2022.01)
*H04L 67/02* (2022.01)
(Continued)

(52) U.S. Cl.
CPC ......... *H04L 67/1001* (2022.05); *G06N 20/00* (2019.01); *H04L 41/0816* (2013.01);
(Continued)

(58) Field of Classification Search
CPC ...... G06F 9/5077; G06N 20/00; G06N 20/20; G06N 3/08; G08B 13/19671;
(Continued)

(56) References Cited

U.S. PATENT DOCUMENTS 10,621,005 B2 4/2020 Wong et al.
2019/0273746 A1 9/2019 Coffing
(Continued)

FOREIGN PATENT DOCUMENTS

EP 3720181 10/2020
WO 2018053122 A1 3/2018

OTHER PUBLICATIONS

Provisional 62914974 (Year: 2019).*
(Continued)

*Primary Examiner* — June Sison
(74) *Attorney, Agent, or Firm* — BainwoodHuang

(57) ABSTRACT

Techniques manage cluster resources within an application environment. The techniques involve identifying a group of cluster resources from a plurality of cluster resources of the application environment, the plurality of cluster resources being constructed and arranged to provide a plurality of services. The techniques further involve forming an application slice having the group of cluster resources. The techniques further involve deploying the application slice to provide services. Certain techniques provide a platform that allows operators to build application slices (or application overlays) that are a way of grouping application pods (or containers) based on one or more organizing principles such as velocity of deployment, security, governance, etc.

27 Claims, 11 Drawing Sheets

(51) Int. Cl.
| | |
|---|---|
| *G06N 20/00* | (2019.01) |
| *H04L 41/0816* | (2022.01) |
| *H04L 47/20* | (2022.01) |
| *H04N 21/2187* | (2011.01) |
| *H04N 21/422* | (2011.01) |
| *H04N 21/431* | (2011.01) |
| *H04N 21/433* | (2011.01) |
| *H04N 21/466* | (2011.01) |
| *H04N 21/472* | (2011.01) |
| *H04L 67/60* | (2022.01) |

(52) U.S. Cl.
CPC .............. *H04L 47/20* (2013.01); *H04L 67/02* (2013.01); *H04L 67/60* (2022.05); *H04N 21/2187* (2013.01); *H04N 21/42203* (2013.01); *H04N 21/4312* (2013.01); *H04N 21/4334* (2013.01); *H04N 21/466* (2013.01); *H04N 21/47217* (2013.01)

(58) Field of Classification Search
CPC ..... H04L 41/0816; H04L 47/20; H04L 67/02; H04L 67/1002; H04L 67/1008; H04L 67/101; H04L 67/1023; H04L 67/1029; H04L 67/32; H04L 67/34; H04N 21/2187; H04N 21/42203; H04N 21/4312; H04N 21/4334; H04N 21/466; H04N 21/47217
See application file for complete search history.

(56) References Cited

U.S. PATENT DOCUMENTS

| | | |
|---|---|---|
| 2020/0153699 A1 | 5/2020 | Bai et al. |
| 2020/0257566 A1 | 8/2020 | Ganguli et al. |
| 2021/0014133 A1 | 1/2021 | Maciocco et al. |
| 2021/0019194 A1* | 1/2021 | Bahl ........................ H04L 67/34 |
| 2021/0112049 A1* | 4/2021 | Yigit ..................... H04W 12/06 |
| 2021/0144517 A1* | 5/2021 | Guim Bernat ........ G06F 9/4881 |
| 2022/0014963 A1* | 1/2022 | Yeh ......................... G06N 7/005 |
| 2022/0121455 A1* | 4/2022 | Hoban ................ H04L 41/5025 |

OTHER PUBLICATIONS

International Search Report dated Dec. 2, 2021, for application No. PCT/US2021/044643, 16 pages.
Buzachis, Alina, et al.: "Towards Osmotic Computing: Analyzing Overlay Network Solutions to Optimize the Deployment of Container-Based Microservices in Fog, Edge and IoT Environments", 2018 IEEE 2nd International Conference on Fog and Edge Computing (ICFEC), IEEE, May 1, 2018 (May 1, 2018), pp. 1-10.
Ali, et al.; "Cloud-Native Network Slicing Using Software Defined Networking Based Multi-Access Edge Computing: a Survey," IEEE Access, IEEE, USA, vol. 9, Jan. 8, 2021, pp. 10903-10924.
Anonymous; "Multi-Tenant Design Considerations for Amazon Eks Clusters," Mar. 27, 2020, retrieved from the internet: URL:https://avs.amazon.com/blogs/containers/multi-tenant-design-considerations-for-amazon-eks-clusters/ [retrieved on May 30, 2022], pp. 1-7.
Truyen, et al; "Towards a Container-Based Architecture for Multi-Tenant SAAS Applications," Adaptive and Reflective Middleware, ACM, 2 Penn Plaza, Suite 701 New York, NY 10121-0701 USA, Dec. 12, 2016, pp. 1-6.

\* cited by examiner

PROVIDING A SET OF APPLICATION SLICES WITHIN AN APPLICATION ENVIRONMENT

CROSS REFERENCE TO RELATED APPLICATIONS

This application is a regular utility application based on earlier-filed U.S. Application No. 63/061,364 filed on Aug. 5, 2020, entitled "Real Time Edge Inference Platform", the contents and teachings of which are hereby incorporated by reference in their entirety.

Additionally, this application claims priority to and the benefit of earlier-filed U.S. Application No. 63/183,244 filed on May 3, 2021, entitled "Smart Application Framework", the contents and teachings of which are hereby incorporated by reference in their entirety.

BACKGROUND

A monolithic application may consist of a few tightly coupled application components generated from a large code base. Such components may include a client-side component (e.g., a GUI, browser code, etc.), a server-side component (e.g., data processing logic, a webserver, etc.), one or more databases, and so on.

In contrast to a monolithic application, an application that uses a microservices architecture is typically constructed from a collection of small independent microservice units. Such microservice units have their own coding/logic, databases, etc., and are able to provide independent (or loosely coupled) microservices.

SUMMARY

A new opportunity has arisen from the development of the 'Service Mesh' (like Istio) and 'Network Service Mesh (NSM)' constructs originating from the development of Kubernetes and microservices and other technologies under the umbrella of 'Cloud Native Computing'. These technologies have enabled multi-cloud distributed applications with Kubernetes microservices clusters deployed across multiple public clouds, edge clouds and customer premise private clouds. It is now possible to create an application specific overlay infrastructure that interconnects distributed application clusters/pods across domains. These application specific overlays can now have tight binding between application and its overlay network. Applications can now specify the exact connectivity and QOS requirements required for the application. This allows application developers to build and deploy application overlays that support application driven traffic engineering/steering with network-level QOS on the underlying infrastructure.

Improved techniques are directed to providing a set of application slices within an application environment. Such techniques may involve an application mesh which may be further referred to within this document as the Avesha Smart Application Mesh (abbr. "Avesha Mesh")—a scalable inter-domain Kubernetes application infrastructure platform that is designed to optimize the distributed multi-cloud, multi edge-cloud Kubernetes application deployments. The platform allows operators to build application slices—application overlays—that are a way of grouping application pods (or containers) based on one or more organizing principles such as velocity of deployment, traffic QOS and prioritization, security, governance, etc.

One embodiment is directed to a method of managing cluster resources within an application environment, the method comprising:
(A) identifying a group of cluster resources from a plurality of cluster resources of the application environment, the plurality of cluster resources being constructed and arranged to provide a plurality of services;
(B) forming an application slice having the group of cluster resources; and
(C) deploying the application slice to provide services.

Another embodiment is directed to electronic circuitry which includes memory and control circuitry coupled to the memory. The memory stores instructions which, when carried out by the control circuitry, cause the control circuitry to perform a method of:
(A) identifying a group of cluster resources from a plurality of cluster resources of an application environment, the plurality of cluster resources being constructed and arranged to provide a plurality of services,
(B) forming an application slice having the group of cluster resources, and
(C) deploying the application slice to provide services.

Yet another embodiment is directed to a computer program product having a non-transitory computer readable medium which stores a set of instructions to manage cluster resources within an application environment. The set of instructions, when carried out by computerized circuitry, causes the computerized circuitry to perform a method of:
(A) identifying a group of cluster resources from a plurality of cluster resources of the application environment, the plurality of cluster resources being constructed and arranged to provide a plurality of services;
(B) forming an application slice having the group of cluster resources; and
(C) deploying the application slice to provide services.

It should be understood that such cluster resources may be constructed and arranged to provide network services and/or application services across one or more clusters. Accordingly, once the application slice is deployed, the application slice is able to provide services (or microservices) to one or more applications (services and microservices).

In some arrangements, forming the application slice includes providing respective overlay network components at the cluster resources of the group to provide network connectivity between the cluster resources of the group. Such network components may include network services and/or controllers.

In some arrangements, forming the application slice includes providing respective applications specific overlay network components at the cluster resources of the group to provide network connectivity between the cluster resources of the group. Such network components may include network services and/or controllers.

In some arrangements, the group of cluster resources includes first cluster resources that provide a first service and second cluster resources that provide a second service that is different from the first service. Additionally, forming the application slice further includes configuring the respective applications specific overlay network components at the cluster resources of the group to provide inter-cluster communications among the first cluster resources and the second cluster resources over a private address space to provide traffic isolation and control.

In some arrangements, the group of cluster resources includes first cluster resources that provide a same service. Additionally, forming the application slice further includes configuring the respective applications specific overlay network components at the cluster resources of the group to provide inter-cluster communications among the first cluster resources that provide the same service.

In some arrangements, the group of cluster resources includes a first cluster resource that provides a first service and a second cluster resource that provides a second service that is different from the first service. Additionally, forming the application slice further includes configuring the respective applications specific overlay network components at the cluster resources of the group to provide inter-cluster communications between the first cluster resource and the second cluster resource.

In some arrangements, identifying the group of cluster resources from the plurality of cluster resources of the application environment for application slice deployment includes receiving a set of organization parameters for the application, and based on the set of organization parameters for the application, choosing the group of cluster resources from the plurality of cluster resources of the application environment.

In some arrangements, choosing the group of cluster resources from the plurality of cluster resources of the application environment for application slice deployment includes selecting the cluster resources among the plurality of cluster resources of the application environment based on a set of quality of service (QoS) criteria. Along these lines, an application slice may be associated with a QoS profile.

In some arrangements, choosing the group of cluster resources from the plurality of cluster resources of the application environment for application slice deployment includes selecting the cluster resources among the plurality of cluster resources of the application environment based on a set of velocity of deployment criteria, a set of security criteria, and a set of governance criteria. In some situations (e.g., after the application slice is formed), further selection of cluster resources may be performed at the time of deploying the application slice.

In some arrangements, the method further includes identifying another group of cluster resources from the plurality of cluster resources of the application environment, forming another application slice having the other group of cluster resources, and deploying the other application slice to provide other services.

In some arrangements, the application slice and the other application slice belong to an application mesh which overlays a microservices mesh. Additionally, the method further includes providing a web interface which supports user input/output to impose control over at least portions of both the application mesh and the microservices mesh.

In some arrangements, the group of cluster resources and the other group of cluster resources have at least one cluster resource in common.

In some arrangements, the group of cluster resources has at least one cluster resource that is not in common with the other group of cluster resources.

In some arrangements, the group of cluster resources and the other group of cluster resources have at least one cluster resource in common. Additionally, the group of cluster resources has at least one cluster resource that is not in common with the other group of cluster resources.

In some arrangements, deploying the application slice to provide the services includes after forming the application slice, deploying application services on to the application slice.

In some arrangements, deploying the application slice to provide the services further includes performing a service discovery operation to enable service to-service communications among the deployed application services on the application slice.

In some arrangements, deploying the application slice to provide the services includes performing a single sign on authentication operation with a slice controller to authenticate a service request source constructed and arranged to provide the service requests to the application slice.

In some arrangements, deploying the application slice to provide the services further includes, after performing a successful single sign-on authentication operation with the slice controller, applying a global set of security policies that imposes federated security over the application slice during application runtime.

In some arrangements, forming the application slice includes configuring respective slice control components for the cluster resources of the group, the respective slice control components being constructed and arranged to manage a life-cycle of the application slice.

It should be understood that, in the cloud context, at least some of electronic circuitry is formed by remote computer resources distributed over a network. Such an electronic environment is capable of providing certain advantages such as flexibility and precise control over resource allocation, high availability and data protection, transparent operation and enhanced security, big data analysis, etc.

Other embodiments are directed to electronic systems and apparatus, processing circuits, computer program products, and so on. Some embodiments are directed to various methods, electronic components and circuitry which are involved in providing a set of application slices within an application environment.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

DETAILED DESCRIPTION

Improved techniques are directed to providing a set of application slices within an application environment. Such techniques may involve an application mesh (or simply the Avesha Mesh)—a scalable inter-domain Kubernetes application infrastructure platform that is designed to optimize the distributed multi-cloud, multi edge-cloud Kubernetes application deployments. The platform allows operators to build application slices—application overlays—that are a way of grouping application pods (or containers) based on one or more organizing principles such as velocity of deployment, security, governance, etc.

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

Figure 1:
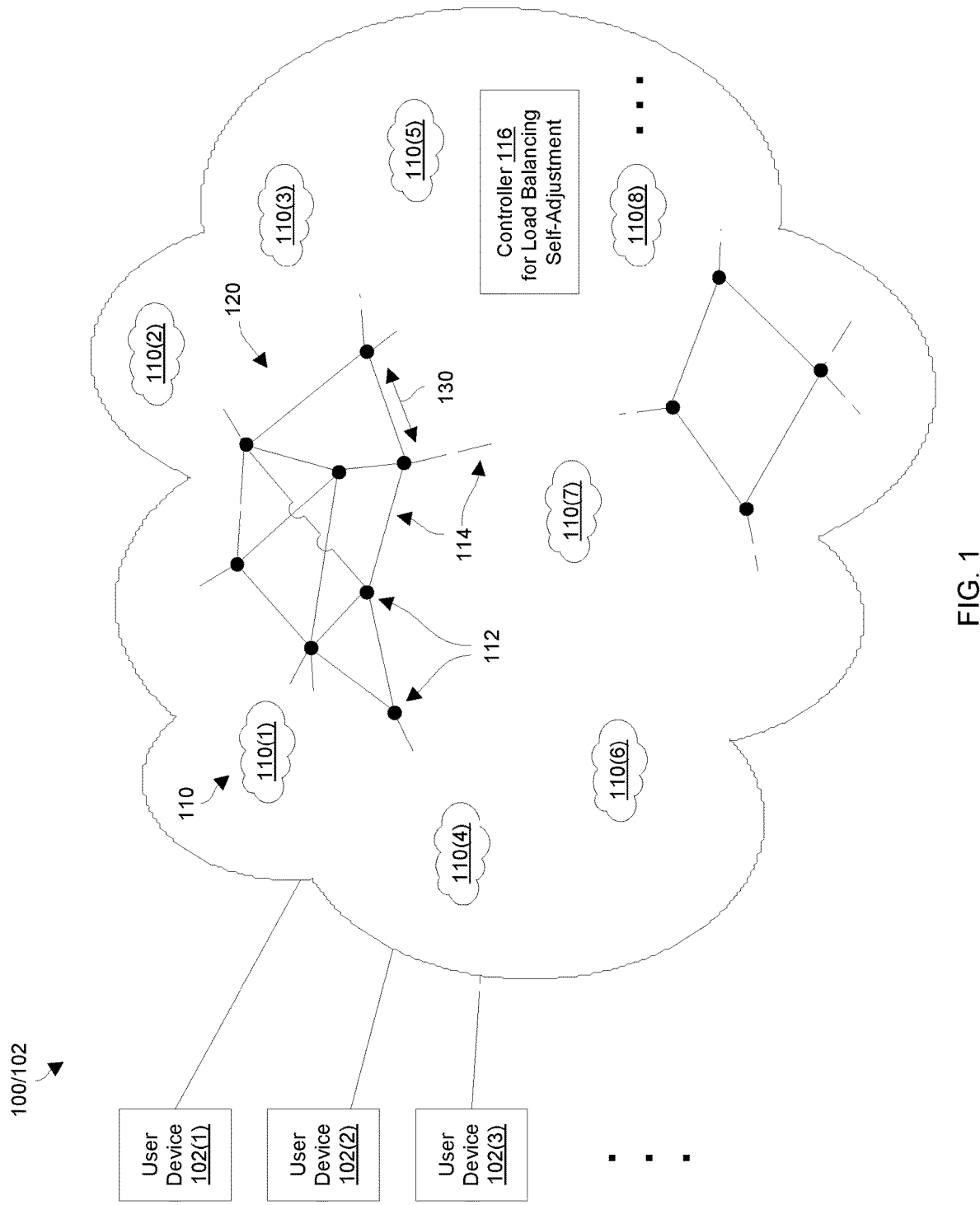
FIG. 1 is a block diagram of an application environment that provides load balancing self-adjustment in accordance with certain embodiments.

FIG. 1 is a block diagram of an application environment 100 that provides a set of application slices in accordance with certain embodiments. Such an application environment 100 is suitable for supporting operation of various applications 102 such as applications that use a microservices architecture, monolithic applications, combinations thereof, etc. Such applications 102 may use TCP, UDP and/or HTTP network protocols over the application environment 100 (e.g., an application network). Along these lines, the application environment 100 provides for improved traffic flow, lower latency, higher throughput, optimized connections, better balanced server loads, satisfying particular quality of service (QoS) objectives, combinations thereof, and so on.

As shown in FIG. 1, user devices 102(1), 102(2), 102(3), ... (collectively, user devices 102) connect to the application environment 100 to utilize services provided by an application 102. Such user devices 102 may be any apparatus capable of performing useful work while utilizing services from the application 102. With the application environment 100 performing load balancing self-adjustment to improve performance, there is overall higher throughput and lower latency at the user devices 102 which in turn may improve the user experience. Moreover, with application slices available for applications, cluster resources of the application environment 100 may be allocated and utilized efficiently with such improved performance without unnecessarily wasting resources via over provisioning (e.g., a well-managed application mesh which overlays a microservices mesh).

The application environment 100 includes clusters 110, nodes 112, links 114, and a controller 116. At least a portion 120 of the application environment 100 is illustrated as a network fabric to indicate that the application environment 100 is capable of having a variety of different topologies including backbone, hub-and-spoke, loop, irregular, combinations thereof, and so on.

The clusters 110 provide different application services to support operation of one or more applications 102 utilized by the user devices 102. As will be explained in further detail shortly, such clusters 110 provide services (e.g., traditional application services, microservices, hybrid services, combinations thereof, etc.) may include multiple components that provide the same service.

It should be understood that a first cluster 110(1) providing a first application service may request a second application service from a second cluster 110(2). Likewise, the second cluster 110(2) may request a third application service from a third cluster 110(3), and so on. Moreover, although FIG. 1 depicts the application environment 100 as including clusters 110(1),110(2), 110(3), 110(4), 110(5), 110(6), 110(7), 110(8), ..., it should be understood that the application environment 100 may include hundreds or even thousands of clusters 110 such as in the context of an application 102 that uses a microservices architecture.

The nodes 112 are constructed and arranged to facilitate and/or monitor operation of the application environment 110. To this end, the nodes 112 may operate as enforcement points that impose policies that influence application behavior and/or performance, and/or monitoring point to sense application environment metrics that identify how the application environment 110 is currently operating. Suitable metrics include network traffic conditions, numbers of connections from sources to destinations, latency, throughput, server loads, QoS metrics, as well as various other parameters.

The links 114 of the application environment 100 may include copper-based data communications devices and cabling, fiber optic devices and cabling, wireless devices, combinations thereof, and so on. Such links 114 connect the nodes 112 together to enable the nodes 112 to exchange various electronic signals 130 (e.g., see the double arrow 130) such as service requests from the user devices 102 and/or service requests from the clusters 110.

The controller 116 is constructed and arranged to control operation of an application mesh and/or a microservices (or services) mesh. To this end, the control 16 may receive input and provide output to a web interface that supports user I/O to impose control over at least portions of both the application mesh and/or the microservices mesh.

Additionally, the controller 116 receives the application environment metrics from various nodes 112 and, based on the application environment metrics, generates new load balancing configurations for deployment among the nodes 112. Such load balancing configurations direct the nodes 112 as to how to load balance service requests among cluster components. Along these lines, the controller 116 may periodically update the load balancing scheme performed by the node 112 (e.g., from random to weighted round robin), replace initial load balancing weights with new load balancing weights, combinations thereof, and so on. Such self-adjusting operation may continue automatically and transparently to the user devices 102 to provide healthy application operation within the application environment 100.

It should be understood that the controller 116 may reside anywhere within the application environment 100. In some arrangements, the controller 116 runs on dedicated equipment (e.g., a datacenter, a dedicated platform, a virtualization platform, etc.). In other arrangements, the controller 116 runs on one or more of the earlier-mentioned components of the application environment 100 (e.g., one or more user devices 102, one or more nodes 112, combinations thereof, etc.). Other locations are suitable for use as well (e.g., in one or more clusters, in the cloud, etc.). Further details will now be provided with reference to FIG. 2.

Figure 2:
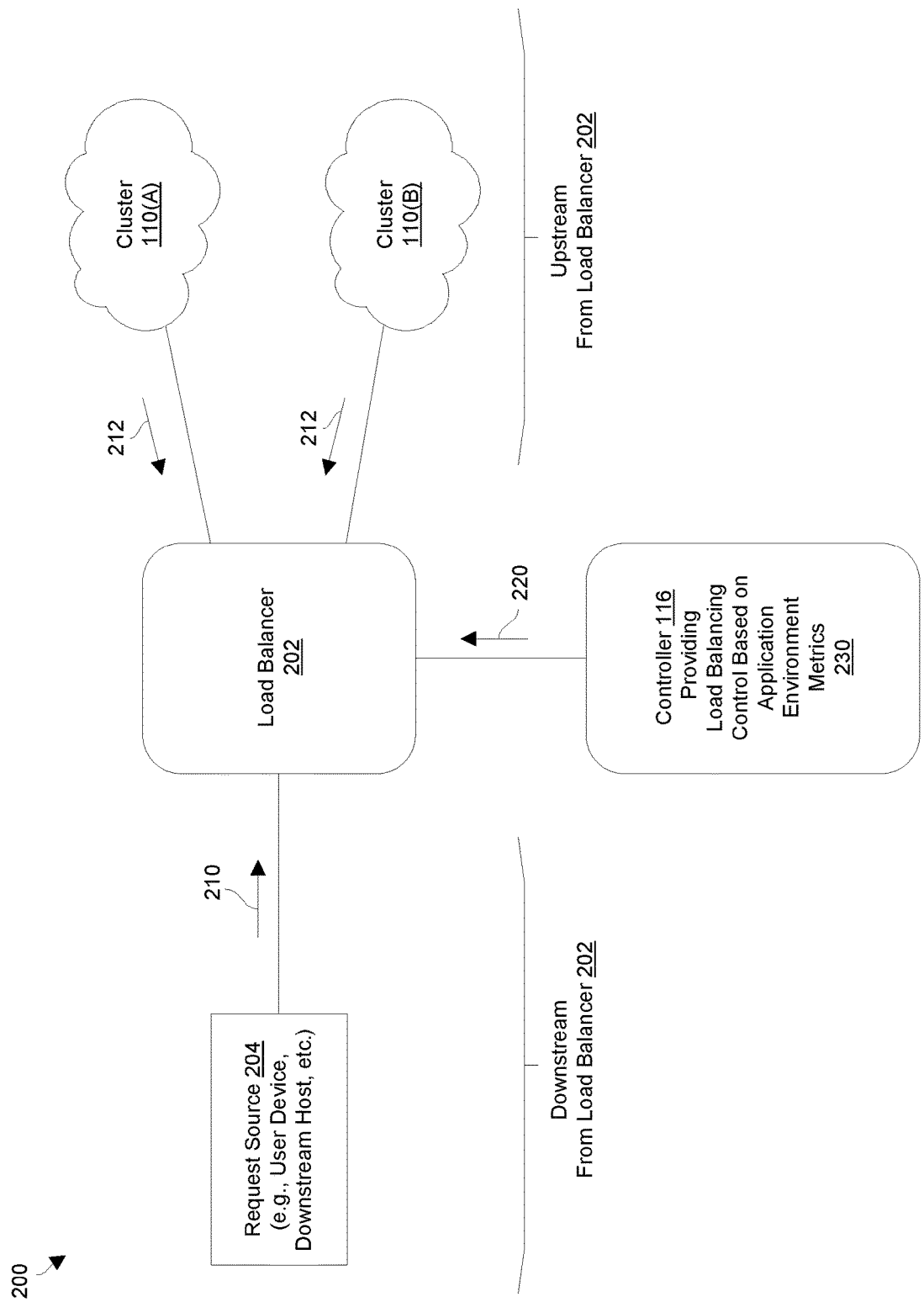
FIG. 2 is a block diagram of load balancing adjustment carried out at a load balancer in accordance with certain embodiments.

FIG. 2 shows a view 200 of load balancing adjustment details carried out by a load balancer 202 in accordance with certain embodiments. Such a load balancer 202 serve as one or more components of the application environment 100 (e.g., see the nodes 112 in FIG. 1).

The load balancer 202 is disposed between a request source 204 and multiple clusters 110(A), 110(B) (also see the clusters 110 in FIG. 1). For simplicity, only two clusters 110 are shown but it should be understood that the load balancer 202 is capable of load balancing traffic among any number of clusters 110 (e.g., three, four, five, etc.). A suitable request source 204 may be one of the user devices 102 or another component of the application environment 100 such as a service running on one of the clusters 110 (FIG. 1). It should be understood that the term "service" refers to a service in the traditional sense for a monolithic application or a microservice for an application that uses a microservices architecture.

The load balancer 202 processes service requests 210 from the request source 204 by forwarding the service requests 210 to the clusters 110 in accordance with a currently imposed load balancing scheme. Accordingly, the request source 204 is considered downstream and the clusters 110 are considered upstream. That is, the service requests 210 are passed from the request source 204 upstream to the clusters 110, and the services 212 in response to the requests 210 flow downstream from the clusters 110 back to the request source 204. Suitable load balancing schemes for the load balancer 202 include round robin, weighted round robin, random, choosing the least loaded cluster 110, and choosing the cluster 110 with the least traffic, among others.

As further shown in FIG. 2, the load balancer 202 receives control input 220 from the controller 116 (also see FIG. 1). As will be explained in further detail shortly, such control input 220 (e.g., commands, instructions, control messages, etc.) from the controller 116 is based on application environment metrics 230 received from the application environment 100. Accordingly and in contrast to static load balancing, the load balancer 202 is able to modify how the requests 210 are load balanced among the clusters 110 (i.e., change operation) in response to changes within the application environment 100 over time. Such modification may involve changing from one type of load balancing scheme to another (e.g., from round robin to random), replacing an existing set of load balancing weights used by the load balancer 202 with a new set of load balancing weights, combinations thereof, and so on.

For example, suppose that the load balancer 202 is currently applying weighted load balancing in accordance with a 50/50 load balancing configuration where 50% of the service requests 210 are sent to cluster 110(A) and the remaining 50% of the service requests 210 are sent to the cluster 110(B). This 50/50 load balancing configuration may initially work well, but become sub-optimal over time due to changes within the application environment 100 such as changes in user device behavior (e.g., increased service demand), changes within the network fabric (e.g., a failed link 114), changes in cluster capacity (e.g., a reduction in throughput at a particular cluster 110), other changes, combinations thereof, etc.

It should be understood that the controller 116 is able to detect such changes by analyzing the application environment metrics 230. As will be explained in further detail shortly and in accordance with certain embodiments, the controller 116 may input such metrics 230 into a policy engine or model which, in turn, outputs a new load balancing configuration. Moreover, in accordance with certain embodiments, the policy engine or model may be updated periodically (e.g., by a human administrator, algorithmically, via machine learning, via reinforced learning, combinations thereof, etc.) to provide optimized load balancing configurations over time.

In the above-described example, the controller 116 suppose that the policy engine generates a new load balancing configuration in response to recent application environment metrics 230. In particular, suppose that the new load balancing configuration is an 80/20 load balancing configuration where 80% of the service requests 210 should now be sent to cluster 110(A) and the remaining 20% of the service requests 210 should now be sent to the cluster 110(B).

Following generation of the new 80/20 load balancing configuration, the controller 116 deploys the new 80/20 load balancing configuration to the load balancer 202 via the control input 220. In response, the load balancer 202 replaces the prior 50/50 load balancing configuration with the new 80/20 load balancing configuration.

Such operation continues over time where the controller 116 receives new application environment metrics 230 from the application environment 100, and generates and deploys new load balancing configurations to the load balancer 202 in a self-adjusting manner. Further details will now be provided with reference to FIG. 3.

Figure 3:
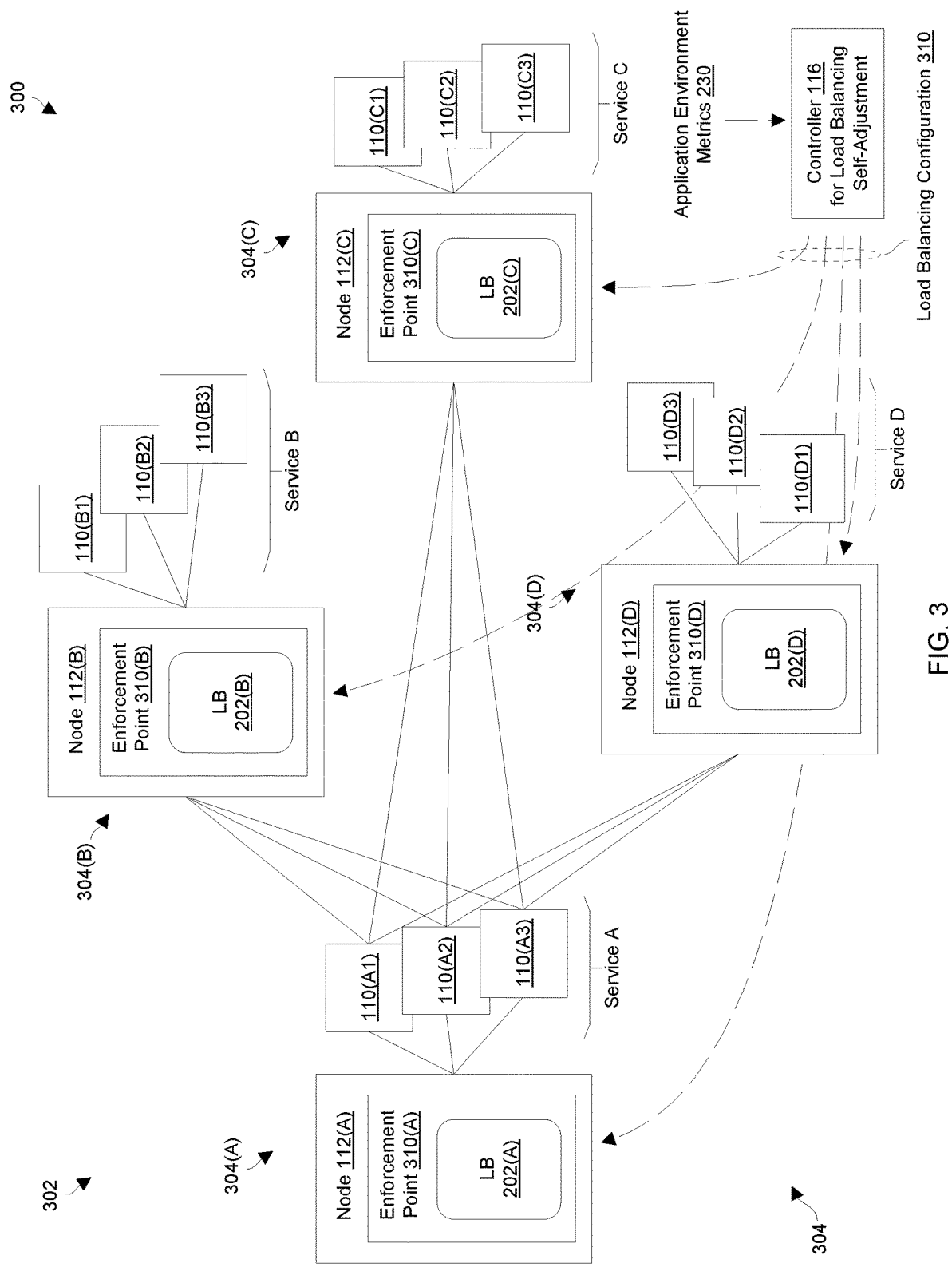
FIG. 3 is a block diagram of a portion of an application environment with multiple load balancers in accordance with certain embodiments.

FIG. 3 shows a view 300 of an example portion 302 of the application environment 100. The example portion 302 may for part of a larger setting such as the application environment 100 in FIG. 1.

As shown in FIG. 3, the example portion 302 includes multiple load balancing pairings 304. Such load balancing pairings 304 include load balancers 202 and clusters 110, where the load balancers 202 load balance service requests 210 to the clusters 110 in accordance with a series of updated load balancing configurations 310 from the controller 116. As explained earlier, such load balancing configurations 310 may be generated by the controller 116 based on application environment metrics 230 obtained from the application environment 100.

In accordance with this example, the load balancing pairing 304(A) includes a load balancer 202(A) and clusters 110(A1), 110(A2), 110(A3) that provide the same service (or microservice) A (also see the services 212 in FIG. 2). Similarly, the load balancing pairing 304(B) includes a load balancer 202(B) and clusters 110(B1), 110(B2), 110(B3) that provide the same service B. Likewise, the load balancing pairing 304(C) includes a load balancer 202(C) and clusters 110(C1), 110(C2), 110(C3) that provide the same service C. Furthermore, the load balancing pairing 304(D) includes a load balancer 202(D) and clusters 110(D1), 110(D2), 110 (D3) that provide the same service D.

In some arrangements, the clusters 110(A1), 110(A2), 110(A3) may be a group of microservice clusters providing the first same microservice. Similarly, the clusters 110(B1), 110(B2), 110(B3) may be another group of microservice clusters providing the second same microservice, and so on.

It should be understood that each pairing 304 is shown as including a load balancer 202 that load balances service requests 210 to three clusters 110 by way of example only. However, each pairings 304 may include a different number of clusters (e.g., one, two, four, five, . . . ) and the load balancer 202 load balances service requests 210 to those different numbers of clusters in accordance with the series of updated load balancing configurations 310 from the controller 116.

In accordance with certain embodiments, one or more of the clusters 110 may be implemented as a server in the traditional sense. Such service clusters are well suited for supporting operation of monolithic applications operating within the application environment 100. For example, such a cluster 1100 may include one or more servers formed via one or more server applications running on dedicated hardware.

Additionally, in accordance with certain embodiments, one or more of the clusters 110 may be a microservices server. Such microservice clusters are well suited for supporting operation of applications using microservices architectures. For example, such a cluster 1100 may be formed via microservice code running in a data center or in a cloud infrastructure. Amazon Web Services offered by Amazon.com, Inc. of Seattle Wash., the Google Cloud Platform offered by Alphabet Inc. of Mountain View, Calif., and Microsoft Cloud Services offered by Microsoft Corporation of Redmond, Wash. are examples of suitable hosting platforms.

It should be understood that the load balancers 202 may reside within nodes 112 (also see FIG. 1). Along these lines, such a node 112 may serve as an enforcement point 310, and that the load balancer 202 forms part of the enforcement point 310 (i.e., to impose a current load balancing policy on service requests 210 (FIG. 2).

It should be understood that the example portion 302 illustrates a possible logical topology rather than a physical topology. Accordingly, the pathways between the various components may include a variety different communications media (e.g., copper, optical fiber, wireless, routers, switches, other type of data communications devices, combinations thereof, and so on), as well as span various distances (e.g., feet, campuses, cities, hundreds of miles, etc.). Further details will now be provided with reference to FIGS. 4 through 8.

Figure 4:
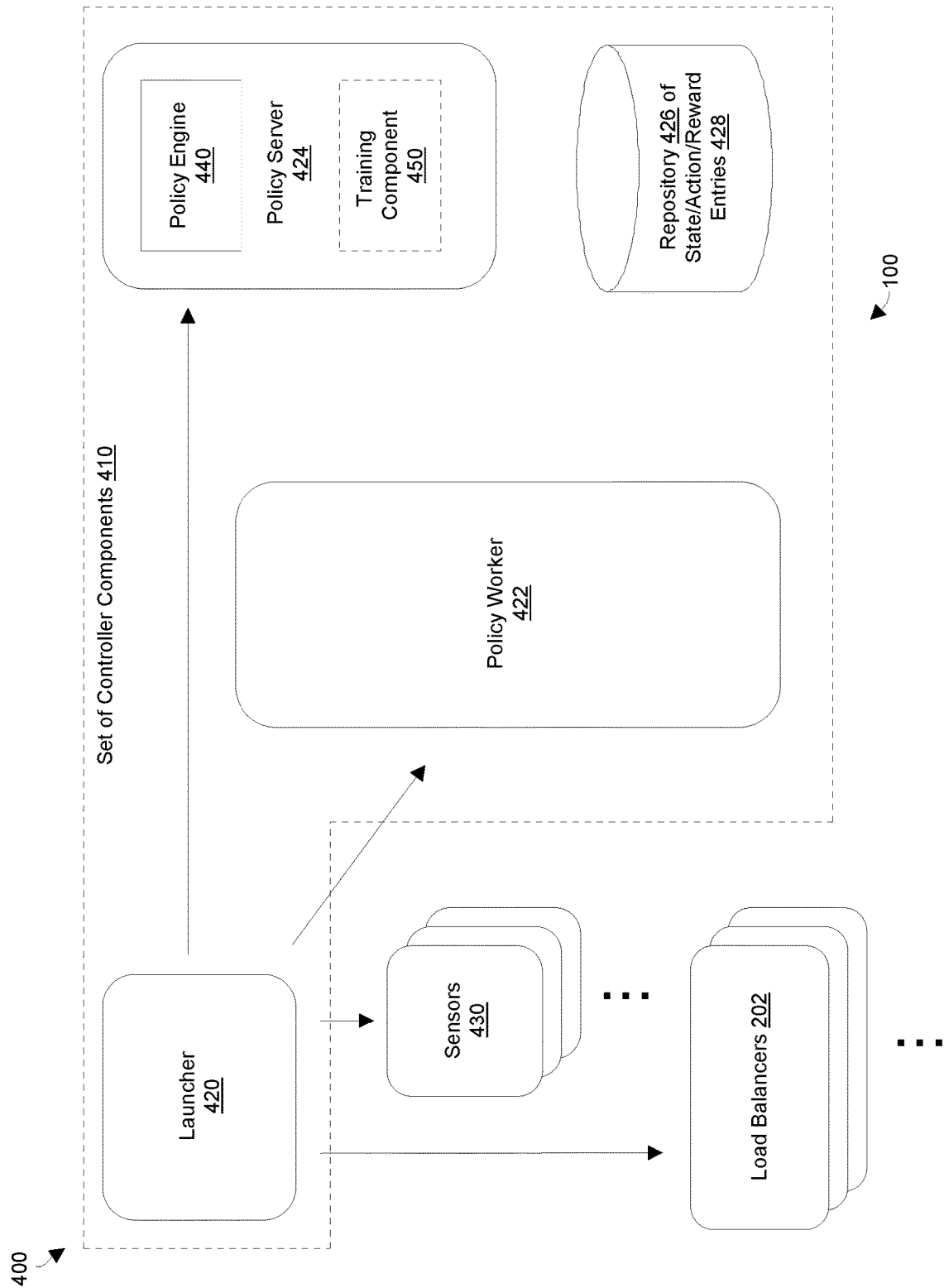
FIG. 4 is a block diagram of particular components are involved in load balancing self-adjustment in accordance with certain embodiments.
Figure 5:
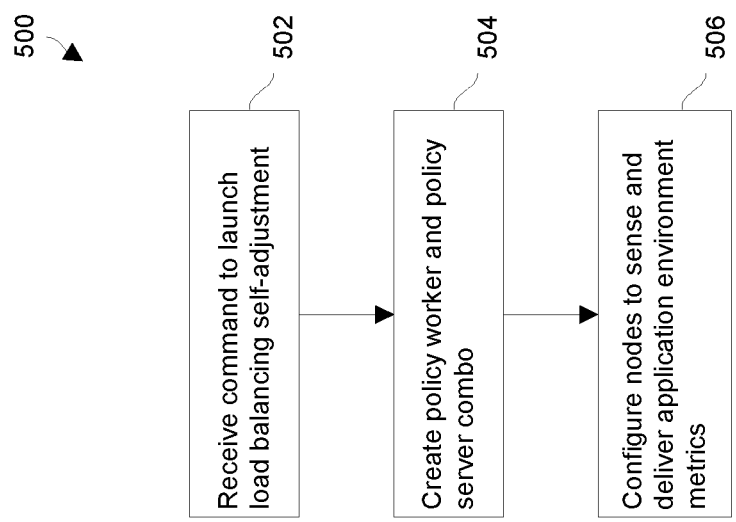
FIG. 5 is a flowchart of a procedure which is performed by a launcher in accordance with certain embodiments.
Figure 6:
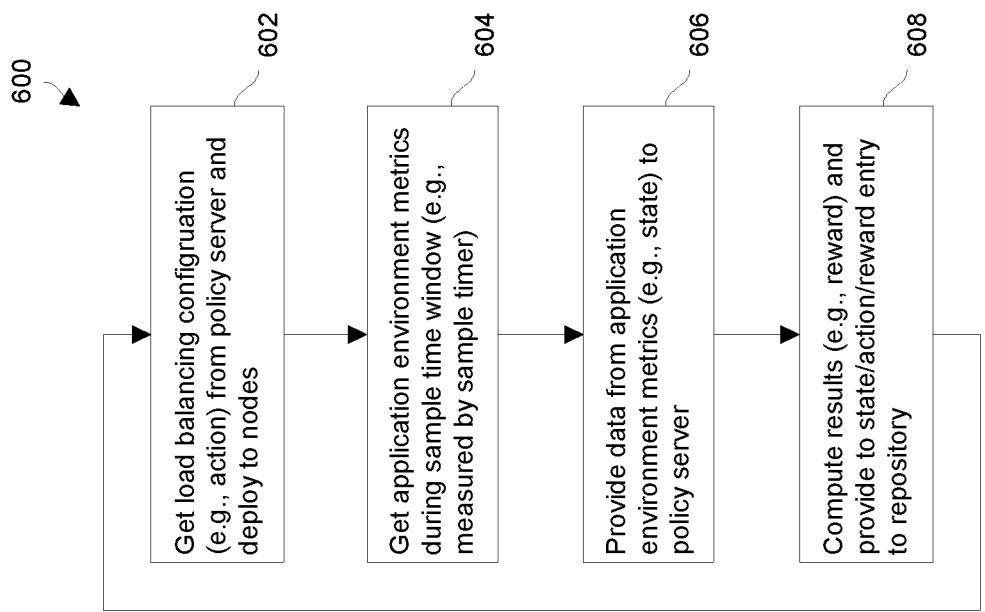
FIG. 6 is a flowchart of a procedure which is performed by a policy worker in accordance with certain embodiments.
Figure 7:
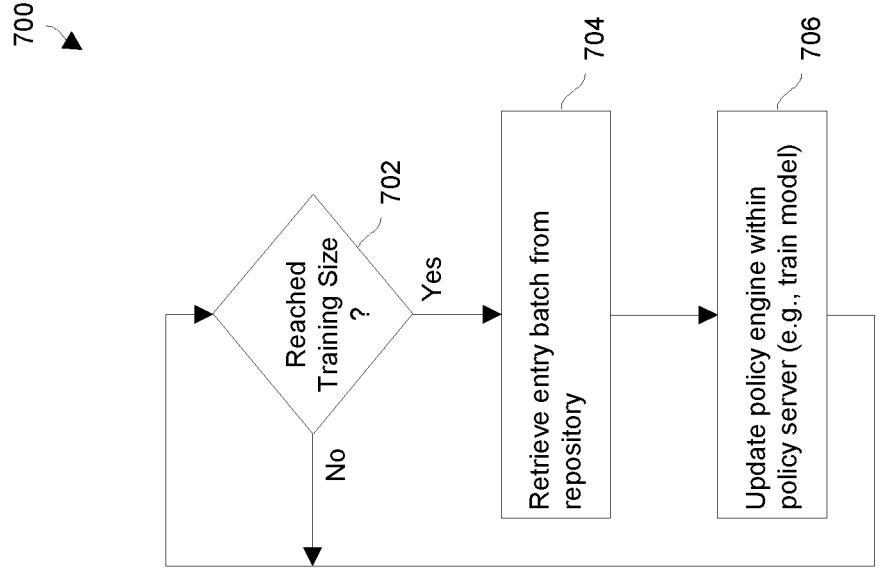
FIG. 7 is a flowchart of a procedure which is performed by a policy server in accordance with certain embodiments.
Figure 8:
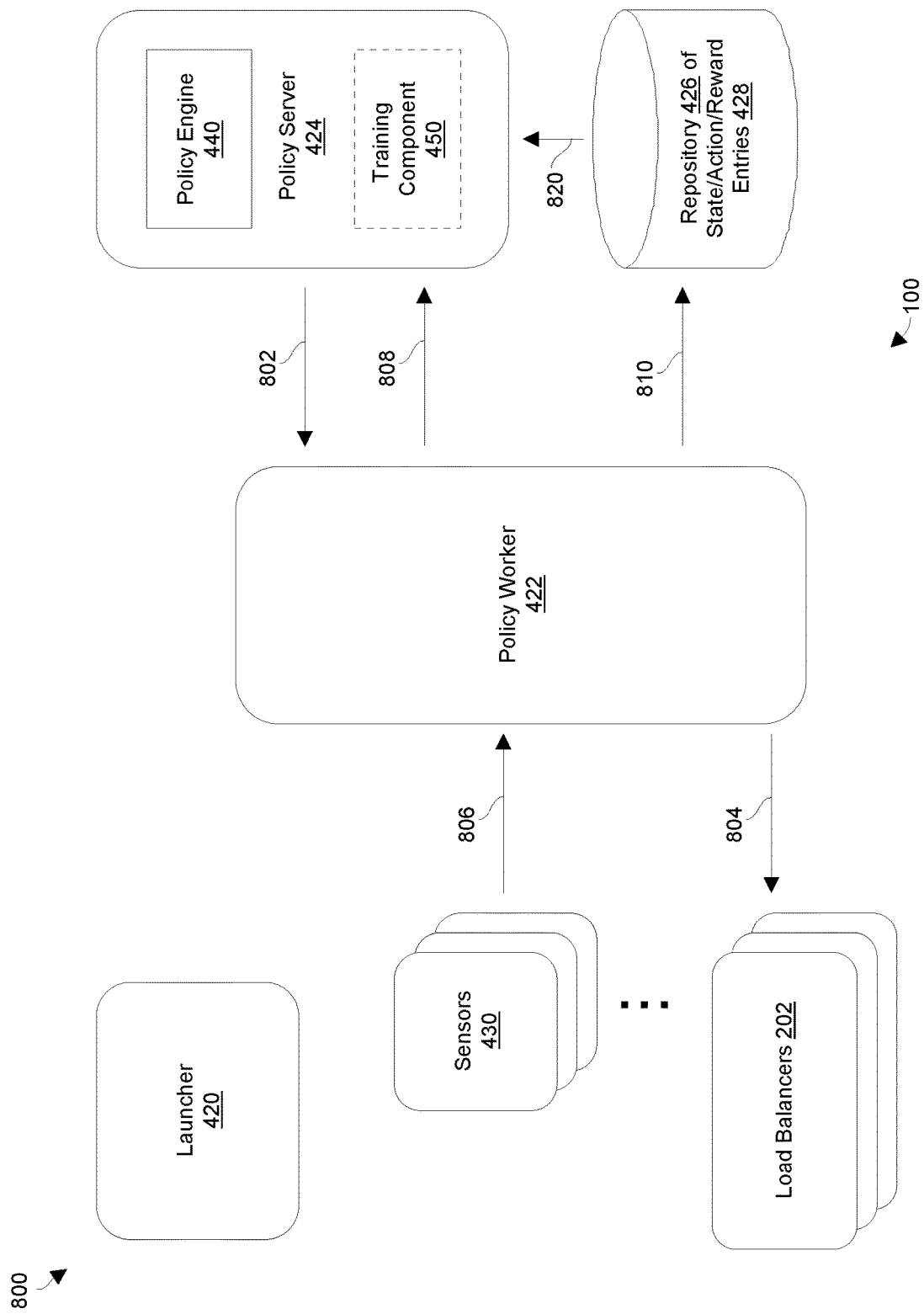
FIG. 8 is another block diagram of the particular components are involved in load balancing self-adjustment in accordance with certain embodiments.

FIGS. 4 through 8 illustrate details of how the controller 116 may be constructed in accordance with certain embodiments. FIG. 4 shows a view 400 in which particular components of an application environment 100 are put into operation. FIG. 5 shows a flowchart of a procedure 500 which is performed by a launcher of the application environment 100. FIG. 6 shows a flowchart of a procedure 600 which is performed by a policy worker of the application environment 100. FIG. 7 shows a flowchart of a procedure 700 which is performed by a policy server of the application environment 100. FIG. 8 shows a view 800 illustrating certain flows during operation of the application environment 100.

As best seen in the view 400 of FIG. 4 and in accordance with certain embodiments, various components of the application environment 100 are involved controlling load balancing self-adjustment. Along these lines, in contrast to the data plane where services 212 are delivered in response to service requests 210 (also see FIG. 2), particular components may reside in a control plane that controls load balancing behavior, and thus performance, of the data plane.

To this end, a set of components 410 of the controller 116 (also see FIGS. 1 and 2) includes a launcher 420, a policy worker 422, a policy server 424, and a repository 426 of state/action/reward entries 428. Such components 410 are shown to be contained within a dashed line to indicate that the form part of the controller 116, and to further illustrate that the components 410 do not necessarily need to reside at the same location. Rather, in some embodiments, one or more of the components 410 of the controller 116 may reside at a different locations (e.g., at a datacenter, remotely in different devices, distributed within the cloud, etc.).

The launcher 420 is constructed and arranged to create one or more of the other components 410 when the application environment 100 is ready for load balancing self-adjustment. Along these lines, the launcher 420 creates the policy worker 424 and the policy server 426 in response to a launch command.

The launcher 420 may further create the repository 426 or the repository 426 may already exist (e.g., as a template, as a database of previously stored sample data or preliminary/simulated data, etc.). As will be explained in further detail shortly, the repository 426 holds entries 428 (e.g., tuples or trajectories) of state details, action details, and reward details identifying particular aspects of the application environment 100 during particular times of operation.

Likewise, the launcher 420 may further create the sensors 430 and/or the load balancers 202 which reside within various nodes 112 of the application environment 100. Alternatively, the sensors 430 and/or load balancers 202 may already exist within the application environment 100 (e.g., previously deployed, available from third party service(s), combinations thereof, etc.).

It should be appreciated that certain off-the-shelf tools may facilitate deployment and/or operation of the sensors 430 and/or load balancers 202. Examples include service mesh and/or application deployment tools. Istio is suitable for implementing certain service mesh features. Prometheus is suitable for certain event monitoring and/or alerting features. Kubernetes is suitable for implementing certain deployment features.

The policy worker 422 is constructed and arranged to communicate with the various components in the view 400. In particular and as will be explained in further detail shortly, the policy worker 422 obtains application environment metrics 230 from the sensors 430 (also see FIGS. 2 and 3). Additionally, the policy worker 422 provides data relating to the application environment metrics 230 to the policy server 424 and the repository 426. Furthermore, the policy server 424 receives load balancing configurations from the policy server 424 and deploys the load balancing configurations to the load balancers 202.

The policy server 424 is constructed and arranged to apply data of application environment metrics 230 obtained from the policy worker 422, and generate new load balancing configurations for modifying operation of the load balancers 202 going forward. In some arrangements, the policy server 424 maintains a policy engine 440 which is equipped with a model that routinely receives the data of the application environment metrics 230 as state details (i.e., input), and provides new load balancing configurations as action details (i.e., output for the current input).

In accordance with certain embodiments, the policy server 424 further includes a training component 450, and the model of the policy engine 440 is periodically trained. As will be explained in further detail shortly, such training may involve updating the model with information from the repository 426. Suitable training methodologies include, among others, algorithmic implementations, supervised learning, unsupervised learning, reinforced learning, other machine learning techniques, combinations thereof, and so on.

The repository 426 is constructed and arranged to store state/action/reward entries 428. Such entries 428 may initially be from a template or preliminary. However, the policy worker 422 then continues to store further state/action/reward entries 428 within the repository 426 during operation of the application environment 100 (FIG. 1). Then, as just mentioned, such entries 428 may be used to periodically update the policy engine 440 of the policy server 424.

FIG. 5 shows a procedure 500 which is performed by the launcher 420 in accordance with certain embodiments. Such a procedure 500 prepares a application environment 100 (FIG. 1) to perform load balancing self-adjustment.

At 502, the launcher 420 receives a launch command. Such a command may be provided by an administrator as part of an initial setup routine.

At 504, the launcher 420 creates the policy worker 422 and the policy server 424. In some arrangements, the launcher 420 may create other components such as the repository 426 and/or the sensors 430 if such components are not already in place. It should be understood that various components 410 such as the policy worker 422, the policy server 424, and the repository 426 may be co-located within application environment 100 to minimize disruption in communications between. However, such components 410 may also be distributed within the application environment 100, e.g., at various locations within the cloud to take advantage of processing power, connectivity, scaling features, etc.

At 506, the launcher 420 configures the nodes 112 for sensing and delivery of particular application environment metrics 230. In accordance with certain embodiments, such application environment metrics 230 may include, among others, network traffic conditions, number of connections from source to destinations, latency, throughput, server loads, and the like.

FIG. 6 shows a flowchart of a procedure 600 which is performed by the policy worker 422 in accordance with certain embodiments. It should be understood that the procedure 600 may operate continuously to enable the application 102 running in the application environment 100 to self-adjust in an ongoing manner over time. FIG. 8 shows a view 800 of particular flows that occur and reference will be made to FIG. 8 when discussing the procedure 600 in further detail.

At 602, the policy worker 422 obtains a load balancing configuration from the policy server 424 (arrow 802 in FIG. 8) and deploys the load balancing configuration to load balancers 202 among the nodes 112 (arrow 804 in FIG. 8). Along these lines, the load balancing configuration may include sets of load balancing weights to be distributed among the various load balancers 202 (e.g., 20% on port A of load balancer #1, 40% on port B of load balancer #1, 40% on port C of load balancer #1, 50% 40% on port A of load balancer #2, 50% 40% on port B of load balancer #2, and so on). This load balancing configuration may be referred to as action details or simply an action.

Upon receipt of the sets the load balancing weights from the policy worker 422, the load balancers 202 modify their operation in accordance with the new load balancing weights. Accordingly, the behavior of the application 100 may improve based on the newly deployed load balancing configuration.

It should be understood that the load balancing configuration is described above as including load balancing weights by way of example. However, other load balancing changes may occur in place of or in addition to the weights. For example, one or more of the load balancers 202 may be directed to switch from performing random load balancing to weighted round robin load balancing, one or more other load balancers 202 may be directed to switch from weighted round robin load balancing to favor the least loaded cluster 110, and so on.

At 604, the policy worker 422 obtains application environment metrics 230 from the sensors 430 during a sample time window (arrow 806 in FIG. 8). Such a sample time window may be measured by a sample timer. A variety of amounts of times are suitable for the sample time window (e.g., 5 minutes, 15 minutes, 30 minutes, 1 hour, 2 hours, etc.).

At 606, the policy worker 422 provides data from the application environment metrics 230 to the policy server 424 (arrow 808 in FIG. 8). Along these lines, the policy work 422 may provide the raw application environment metrics 230 to the policy server 424. Alternatively, the policy work 422 may process the application environment metrics 230 (e.g., sum or tally certain metrics, compute or flag certain observations within the metrics, filter out or emphasize certain metrics relating to certain events, and so on). This instance of application environment metrics 230 provided to the policy server 424 may be referred to as state details or simply a state.

As mentioned earlier, in response to the data from the application environment metrics 230, the policy server 424 creates a new load balancing configuration. In some arrangements, the state is applied to a model (e.g., see the policy engine 440 in FIG. 8) which outputs a new action as the new load balancing configuration.

At 608, the policy worker 422 computes a set of results based on the action from 602 and the resulting state from 604. Such a set of results may be referred to as reward details or simply a reward. For example, a range of 0 to 1 may be used where 1 indicates a maximum improvement in the state in response to the action, and 0 indicates no improvement in the state in response to the action. The policy worker 422 then provides the action, the state, and the reward to the repository 426 (arrow 810 in FIG. 8) which is then stored as an entry 428 (i.e., a trajectory) in the repository 426.

At this point, 608 proceeds back to 602. Accordingly, the policy worker 422 repeats the procedure 600 for a new action from the policy server 424.

FIG. 7 shows a flowchart of a procedure 700 which is performed by the policy server 424 in accordance with certain embodiments. It should be understood that the procedure 700 may operate periodically to update a model of the policy engine 44 over time.

At 702, the policy server 424 determines whether the repository 426 has stores a predefined number of new entries 428 for a new training iteration. Such a determination may be made via a counter that counts newly received states from the policy worker 422. If the training size has not yet been reached, 702 waits (or loops) until the training size is reached. Once the training size is reach (i.e., the training component 450 detects that the repository 426 has stored a total number of new entries 428 equaling a predefined training size), 702 proceeds to 704 to begin a training session to train a model of the policy engine 440.

At 704, the policy server 424 begins the training session by accessing the repository 426. In particular, the training component 450 accesses the entries 428 (e.g., state/action/reward trajectories) from the repository 426 (arrow 820 in FIG. 8).

At 706, the policy server 424 updates the model. Such an update process may involve standard artificial intelligence teaching techniques. It should be appreciated that the particular combination of application environment metrics 230 (i.e., which parameters) that are sensed and adjusted may result in particular effectiveness in improving application performance.

In certain embodiments, the model includes a neural network and the training component 450 performs reinforcement learning. However, it should be understood that other training techniques are suitable for use such as making adjustments to alternative policy algorithms, utilizing other forms of artificial intelligence, and so on.

Once the training session has been completed, 706 proceeds back to 702. Accordingly, the policy server 424 repeats the procedure 700 enabling the policy server 424 to self-adjust in an ongoing manner. Further details will now be provided with reference to FIG. 9.

Figure 9:
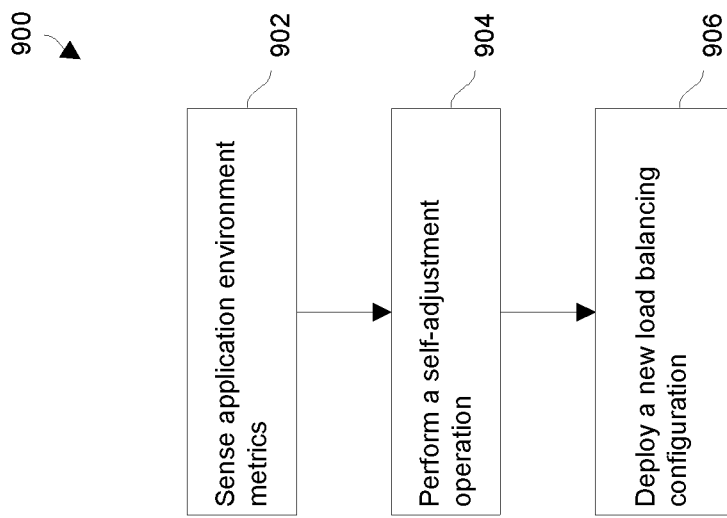
FIG. 9 is a flowchart of a procedure which is performed by a control plane in accordance with certain embodiments.

FIG. 9 is a flowchart of a procedure 900 which is performed by a control plane of an application environment to perform load balancing self-adjustment in accordance with certain embodiments.

At 902, while nodes of the application environment load balance traffic among clusters that provide services for an application in accordance with a first load balancing configuration, the control plane senses application environment metrics. Such metrics may include current network traffic conditions, numbers of connections from sources to destinations, latency, throughput, server loads, as well as various other parameters.

At 904, the control plane performing a self-adjustment operation that generates a second load balancing configuration based on the application environment metrics. The second load balancing configuration is different from the first load balancing configuration. Along these lines, the configurations may differ in terms of load balancing weights, load balancing schemes (e.g., random, round robin, etc.), which paths/links to use or not use, combinations thereof, and so on.

At 906, the control plane deploys the second load balancing configuration among the nodes to enable the nodes to load balance the traffic among the clusters that provide the services for the application in accordance with second load balancing configuration in place of the first load balancing configuration. Such operation enables the application environment to enjoy ongoing self-adjustment.

Figure 10:
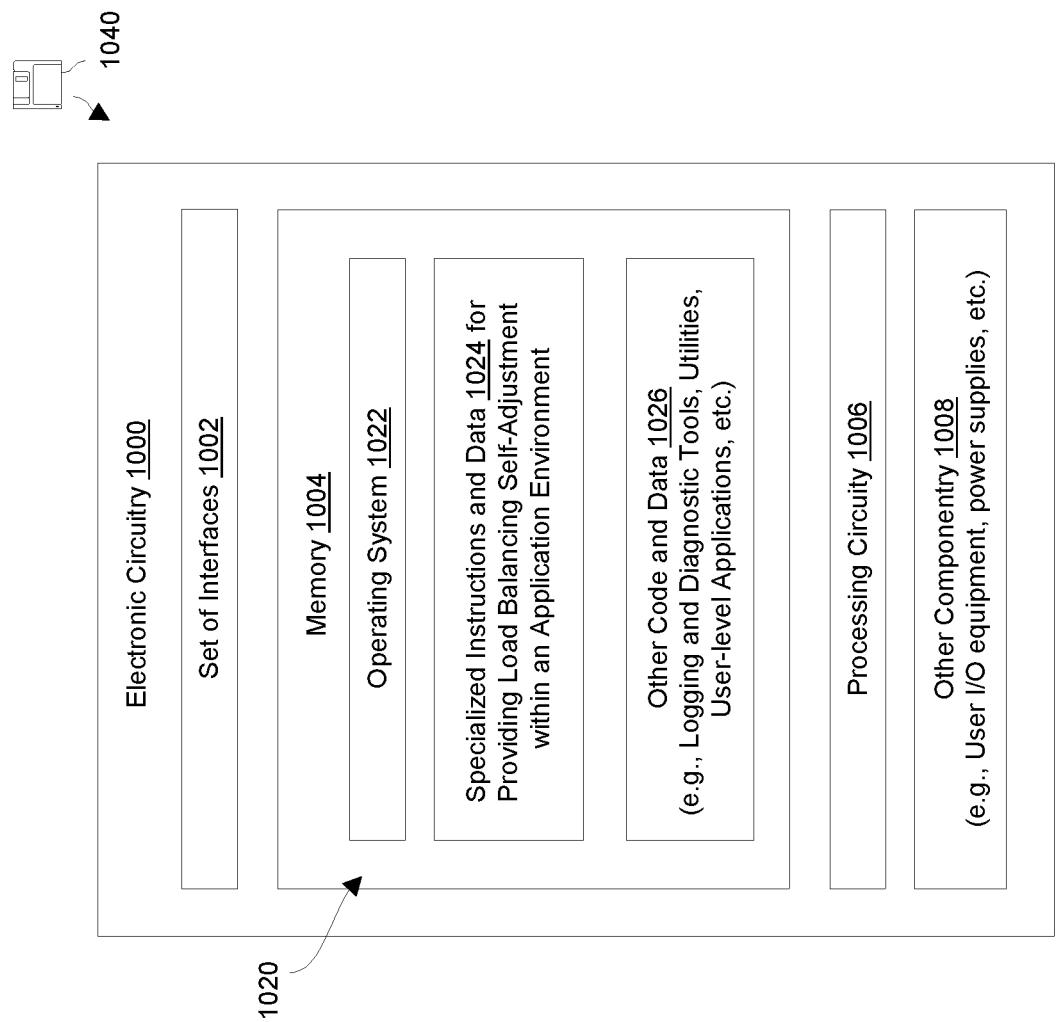
FIG. 10 is a block diagram of electronic circuitry which is suitable for use within the application environment of FIG. 1 in accordance with certain embodiments.

FIG. 10 shows electronic circuitry 1000 which is suitable for use within the application environment 100 in accordance with certain embodiments (also see FIG. 1). The electronic circuitry 1000 includes a set of interfaces 1002, memory 1004, and processing circuitry 1006, and other circuitry (or componentry) 1008.

The set of interfaces 1002 is constructed and arranged to connect the electronic circuitry 1000 to the fabric of the application environment 100 (also see FIG. 1) to enable communications with other devices of the application environment 100 (e.g., the user devices 102, the clusters 110, the nodes 112, etc.). Such communications may be IP-based, SAN-based, cellular-based, cable based, fiber-optic based, wireless, combinations thereof, and so on.

Accordingly, the set of interfaces 1002 may include one or more computerized interfaces. Accordingly, the set of interfaces 1002 enables the electronic circuitry 1000 to robustly and reliably communicate with other external apparatus.

The memory 1004 is intended to represent both volatile storage (e.g., DRAM, SRAM, etc.) and non-volatile storage (e.g., flash memory, magnetic memory, etc.). The memory 1004 stores a variety of software constructs 1020 including an operating system 1022, specialized instructions and data 1024, and other code and data 1026. The operating system 1022 refers to particular control code such as a kernel to manage computerized resources (e.g., processor cycles, memory space, etc.), drivers (e.g., an I/O stack), and so on.

The specialized instructions and data 1024 refers to particular instructions for generating and deploying load balancing configurations for load balancing self-adjustment. In some arrangements, the specialized instructions and data 1024 is tightly integrated with or part of the operating system 1022 itself. The other code and data 1026 refers to applications and routines to provide additional operations and services (e.g., data logs, diagnostics, traces, etc.), user-level applications, administrative tools, utilities, and so on.

The processing circuitry 1006 is constructed and arranged to operate in accordance with the various software constructs 1020 stored in the memory 1004. As will be explained in further detail shortly, the processing circuitry 1006 executes the operating system 1022 and the specialized code 1024 to form specialized circuitry that robustly and reliably provides load balancing self-adjustment within an application environment 100 (FIG. 1). Such processing circuitry 1006 may be implemented in a variety of ways including via one or more processors (or cores) running specialized software, application specific ICs (ASICs), field programmable gate arrays (FPGAs) and associated programs, discrete components, analog circuits, other hardware circuitry, combinations thereof, and so on.

In accordance with certain embodiments, the electronic circuitry 1000 is optimized for processing artificial intelligence/neural net related operations. Along these lines, the processing circuitry 1006 may include specialized co-processing and related neural net architectures, GPUs, and/or other related neural net/AI hardware for training and/or operating deep learning and related systems.

In the context of one or more processors executing software, a computer program product 1040 is capable of delivering all or portions of the software constructs 1020 to the electronic circuitry 1000. In particular, the computer program product 1040 has a non transitory (or non-volatile) computer readable medium which stores a set of instructions that controls one or more operations of the electronic circuitry 1000. Examples of suitable computer readable storage media include tangible articles of manufacture and apparatus which store instructions in a non-volatile manner such as DVD, CD ROM, flash memory, disk memory, tape memory, and the like.

The other componentry 1008 refers to other hardware of the electronic circuitry 1000. Along these lines, the electronic circuitry 1000 may include special user I/O equipment (e.g., a display, a keyboard, etc.), power supplies and battery backup units, auxiliary apparatuses, other specialized data storage componentry, etc.

It should be further understood that certain portions of the electronic circuitry 1000 may reside within one or more other components of the application environment such as a user device 102, a cluster 110, a node 112, etc). In accordance with certain embodiments, the electronic circuitry 1000 resides on multiple apparatus for high availability.

As described above, improved techniques involve providing load balancing self-adjustment within an application environment 100. That is, while nodes 112 of the application environment 100 load balance traffic among clusters 110 that provide services for an application 102 in accordance with an existing load balancing configuration, certain application environment metrics 230 are sensed and used to electronically determine a new load balancing configuration to replace the existing load balancing configuration. For example, data from such metrics 230 may be input into a policy engine 440 that applies analytics to smartly generate the new load balancing configuration (e.g., different load balancing weights). The new load balancing configuration is then deployed among the nodes 112 to replace the existing load balancing configuration. With the new load balancing configuration, the application environment 100 is able to provide more efficient and effective performance (e.g., improved traffic flow, lower latency, higher throughput, optimized connections, better balanced server loads, combinations thereof, etc.). As a result, such techniques are able to improve application performance without requiring an operator to provision the application environment with additional resources.

It should be understood that certain embodiments are directed to systems and methods for reinforcement learning/machine learning based workflows for application group policies.

It should be appreciated that applications deployed at the cloud and edge aim to take advantage of the proximity of the deployment to the user, thus ensuring higher throughput and lower latency application performance which in turn improves user experience. The performance of the applications depends on the underlying network connecting the different components of the software. To fully take advantage of the edge and cloud based application deployments, the network parameters need to be fine tuned depending on different parameters like network traffic conditions, number of connections from source to destinations, latency, throughput, server loads and various other parameters.

As the size of the deployment grows in the number of servers, connections, microservices, etc., the total number of parameters to optimize grows at a large rate that makes it impossible to manually adjust them. This in turn causes degraded application performance resulting in poor end user experience. To mitigate this, operators usually deploy more network resources to improve performance thus increasing cost of deployment and operation. However, due to the dynamic nature of the underlying network and resource usages in the deployment, optimizations have to be done on an ongoing basis. The turnaround time required to analyze the problem and come up with different solutions that work may also be unacceptable in most cases.

The application environment with the different software components' lifecycle and operation, and the underlying network is modeled as a Reinforcement Learning system. A Reinforcement Learning and Machine Learning based system can learn the effect of the different parameter settings in the different states of an arbitrarily large application environment that can produce optimum performance for each of the application groups in real time. The operator can specify different policies for each of the application groups and the RL based system can learn to optimize the underlying network and application parameters to meet the policy objectives. The RL based system will operate alongside the application non-intrusively and will continually provide actions that are applied to the application environment such that the overall application group policy objectives are met.

The RL based system can be applied to applications deployed in a star, mesh and other arbitrary network topologies with single or multiple connections from clients (sources) and servers (destinations). The RL based system can be employed in an application deployed as containerized microservices or as execution environments in a virtual/bare-metal machine. The application network can be realized either as a network service mesh/slice or as direct network connections without an underlying mesh or a slice.

In some embodiments, the weights of a load balancer deployed in a network that connects different application software components are continuously modified by the RL system over time depending on the network parameters like latency and throughput, to ensure that application performance objectives are met.

The applications may be using TCP, UDP or HTTP network protocols over the application network.

An application network is a dynamic environment with changing traffic conditions, network latencies, network throughput, resource consumption within each of the application components.

Operators of the network and applications rely on analytics provided by the network operators and their own software to understand where optimizations can be made. In most cases, application networks are started in their default configurations and over time operators of the network and developers of the application software analyze metrics to propose improvements or fixes to problems. Also, in most cases, both network and application resources are over-provisioned to begin with and rely on cloud and edge providers to provide them insight into the different metrics or to provide hooks to dynamically or manually adjust resources in the deployment.

As the application components grow in number and the number of connectivity between their different components increase, the number of parameters in the network and application components can grow at a very fast rate. Adjusting the large number of parameters manually or as determined by offline statistical or analytical methods takes time and the effectiveness of the predicted parameters decreases with passing time. Furthermore, the exercise has to be repeated over the lifetime of the applications. This approach is sub-optimal, error prone, time consuming and not flexible to accommodate multiple and varying performance objectives.

In accordance with certain embodiments, the Reinforcement Learning based system used for application group policies includes:

A component that provides a set of metrics that are available from the environment in real time that can be used to describe the state of the environment in which the application is operating. These metrics are ingested by the RL system and are input to the algorithm that is learning to predict optimal settings or actions. The RL system uses network latency and throughput, application resource utilizations like CPU and memory, current time and other metrics.

An enforcement point(s) in the application network that modifies the behavior of the environment. In one aspect of the environment, this enforcement point is a Load Balancer software that connects different components like sources and destinations in the application. The output of the RL system is a set of actions that are applied to the enforcement point. An RL policy algorithm that is trained on the metrics generated by the environment and learns over time to map the state of the environment to the optimum action like the set of weights that are applied to the load balancer.

The operation of the RL system is as follows:

The enforcement point(s) and the topology of the application network are determined from the deployment and provided to the RL system.

The RL policy algorithm which incorporates a deep learning model that has many parameters (weights) that are adjusted during training. The deep learning model outputs an action to be taken (set of weights for the load balancer) for a given input state.

The state input and its corresponding output from the RL policy model is computed every step duration.

The RL algorithm is trained over time by providing the feedback of its actions as rewards. A trajectory of (state, action, reward) for each step of the algorithm is saved for training at a later time. The duration of each step and training is a configurable parameter.

The reward system of the algorithm is a function of the overall application policy objective as input by the operator of the network.

The algorithm optimizes the RL policy by adjusting its model parameters depending on the (state, action, reward) sequences. For a positive reward, the model parameters are adjusted by taking the gradient of the loss function of the algorithm to the input state and adding the gradient to the model parameters. For a negative reward, the model parameters are adjusted in the negative direction. In this way, over time, the RL system is able to better predict and adjust the parameters of the environment to meet the overall objective. The RL system is able to scale to handle any application network of arbitrary number of connected services.

It will learn over time to optimize the network and application performance to meet the overall objective without the intervention of any operator.

The RL system will continuously operate and adapt to any changes in the environment, topology and other parameters. It can handle application networks implemented over several network protocols including TCP, HTTP and UDP.

The RL system can autonomously operate and learn the different parameters that need to be adjusted to optimize the performance of the application network. It can handle any changes in application deployment and adapt accordingly. There are many components in the RL system. The component responsible to read the metrics from the application environment can be implemented in different ways.

The communication mechanism from the RL system to the components responsible to program the actions could be implemented in different ways.

The RL system can be a standalone application or could be part of the application environment without changing the end result.

The duration of the step in the algorithm could be modified to better suit the application environment dynamics.

The topology of the application network can be reduced to a different representation of topology in the algorithm but the RL system can still be employed in the same way.

Additional Load Balancing Details

It should be further appreciated that classic load balancers (LBs) have static configurations for weights. Classic LBs are used to assign traffic to endpoints based on these weights according to the current load, i.e., number of originating requests. In the event of upstream hosts or the connecting links not performing well, these weights will have to be manually adjusted. The weights are usually assigned by using very simple rules or heuristics based on history of the connections and upstream host performance.

However, in accordance with certain embodiments, an improved load balancing scheme provides an automated way of adjusting the weights of the load balancer. Along these lines, such an improved scheme provides for learning and adapting to changing network conditions, upstream host conditions or application level feedback.

Network Traffic Behavior

By using machine learning algorithms, the effects of many parameters in the network may be combined to predict the weights that will optimize the objective in which the operator is interested. Further, these load balancers can be arranged in a hierarchical manner and the weights can be adjusted to changing path conditions in a multi-hop network of arbitrary topology. As the network complexity increases, adjusting these weights in the load balancer by manual means is impractical, especially given the fact that not all communication between sources and destinations have the same data, bandwidth and compute requirements over time. The improved RL-based load balancer can handle adjusting the weights of the load balancers in a multi-hop network as well.

A/B Testing

During A/B testing of an ecommerce website, the requests from users may be divided into 50% to each version of the website. Over time, if users directed to the new website convert more than 50% of the users are unnecessarily sent to the older website causing loss in revenue. In a RL based setting, the weights of the load balancer can be slowly changed autonomously to accommodate more users to the new website based on the conversion rate. Although this doesn't highlight changing the load balancer based on the network conditions, this highlights how load balancing can help with meeting an overall reward objective using an application level feedback.

This document describes the simulations that compare the performance of a classic load balancer to the improved RL based load balancer.

Requirements

1. A comparison of classic load balancing algorithms versus RL loading balancing algorithms shall be made. The following classic load balancing algorithms will be studied:
   a. Round Robin
   b. Weighted Round Robin
   c. Random
2. The following network topologies shall be assumed:
   a. A single source (downstream) and two destinations (upstream) with load balancing
3. The following objective shall be used as performance criteria:
   a. Number of requests meeting QoS
   b. Utilization—total throughput is maximized across all the links
4. The following QoS objectives shall be supported:
   a. Throughput
     i. This is measured as the average data rate, in Mbps, that is transmitted from the source to the destination via the links from the load balancer to the upstream cluster(s).
   b. Latency
     i. This is measured as the average delay, in /ms or /s, for the data to travel from the source to the destination as measured by each of the links from the load balancer to the upstream cluster(s).
   c. Both
5. The following scenarios shall be simulated for network conditions:
   a. Two path topology:
     i. Path 1 and Path 2 alternate between good and bad over time
       1. Different patterns (alternate, random)
     ii. Path 1 goes completely bad
   b. Hierarchical topology Static Load Balancing Policies Weighted Round Robin This is a simple policy in which each available upstream host is selected in round robin order. If weights are assigned to endpoints in a locality, then a weighted round robin schedule is used, where higher weighted endpoints will appear more often in the rotation to achieve the effective weighting.

WRR works on single requests if they are within a certain duration and the load balancer will partition the requests across hosts based on the weights.

Weighted Least Request

The least request load balancer uses different algorithms depending on whether hosts have the same or different weights.

- all weights equal: An O(1) algorithm which selects N random available hosts as specified in the configuration (2 by default) and picks the host which has the fewest active requests. This is also known as P2C (power of two choices). The P2C load balancer has the property that a host with the highest number of active requests in the cluster will never receive new requests. It will be allowed to drain until it is less than or equal to all of the other hosts.
- all weights not equal: If two or more hosts in the cluster have different load balancing weights, the load balancer shifts into a mode where it uses a weighted round robin schedule in which weights are dynamically adjusted based on the host's request load at the time of selection.

In this case the weights are calculated at the time a host is picked using the following formula:

weight=load_balancing_weight/(active_requests+1)^active_request_bias.

active_request_bias can be configured via runtime and defaults to 1.0. It must be greater than or equal to 0.0.

The larger the active request bias is, the more aggressively active requests will lower the effective weight.

If active_request_bias is set to 0.0, the least request load balancer behaves like the weighted round robin load balancer and ignores the active request count at the time of picking.

For example, if active_request_bias is 1.0, a host with weight 2 and an active request count of 4 will have an effective weight of 2/(4+1)^1=0.4. This algorithm provides good balance at steady state but may not adapt to load imbalance as quickly. Additionally, unlike P2C, a host will never truly drain, though it will receive fewer requests over time.

WLR requires a number of active requests. This will require changes to our simulation and RL policy algorithm.

Random

The random load balancer selects a random available host. The random load balancer generally performs better than round robin if no health checking policy is configured. Random selection avoids bias towards the host in the set that comes after a failed host.

Reinforcement Learning Based Load Balancing

Reinforcement Learning agents learn to take actions in an environment that will maximize the notion of a cumulative reward. The environment is defined as a Markov decision process (MDP) with:

- A set of environment or agent states, S
- A set of actions the agent can take in the environment, A
- A policy Π(a/s), that provides a mapping of actions to states at a certain time t
- A reward function, R, that provides an immediate reward when the state transitions from s to s'.

Unlike Supervised learning, RL does not require explicitly labeled datasets and can even take sub-optimal actions in the short term that maximizes a long term objective in the environment. RL lends itself to learning autonomously in a changing environment. The state, action and reward are taken over discrete time steps.

In an application network, the load balancer setting is formulated as a reinforcement learning problem as follows:

- The actions are the weights that the load balancer applies to the upstream clusters it is connected to.
- The state of the environment is represented by the metrics that are collected over a time duration for each of the links connecting the upstream.
- The reward is a function of the observation derived from the above metrics that shows how far the algorithm is are from reaching the overall objective.

Simulation Methodology

Assume a two path network topology as shown above with a client and a load balancer in the middle splitting traffic to the upstream clusters according to the weights programmed. With a properly functioning load balancer, the traffic to the two upstream nodes are split proportional to the weights W1 and W2,

- Simulate a number of sessions from the client over a time interval and the load balancer diverts these sessions to the two upstreams according to the ratio W1/W2,
- Use the latency of the upstream links from the LB to upstream hosts as the metrics.
- Define latency thresholds as HD and non-HD, i.e., QoS of the link is HD if latency less than LHD, else QoS is non-HD
- The overall objective of the network is to maximize the number of sessions that can be set up over the links that support HD latency, NHD, while the path behavior of the two upstreams are continuously varying.

In the case of fixed weight round robin load balancer with weights W1 and W2 and total number of sessions, N, set up over time, each path is assigned N*W1/(W1+W2) and N*W2/(W1+W2) sessions respectively. The following conclusions can be made analytically.

Given a condition that only one of the paths is good enough to support HD latency over a time interval, the maximum number of sessions that support HD latency, NHD, is equal to the sessions assigned to the good path during that time interval.

If only path 1 support LHD, then, NHD<=N*W1/(W1+W2). If only path 2 supports LHD, then NHD<=N*W2/(W1+W2). The average NHD will be between N*W1/(W1+W2) and N*W2/(W1+W2). If both paths support LHD, then NHD N.

In the case of reinforcement learning based load balancers, once the algorithm has learnt the optimal actions to take over time, the load balancer weights will be programmed to maximize the overall performance. The RL-based LB will assign the higher weight to the good path and a lower weight to the not so good path.

If WH is the optimal higher weight used by the RL-based LB, then the number of sessions that support HD latency will be approximately always equal to N*WH/(WH+WL) and the average will also be closer to the same value. If both paths support LHD, then NEED N, similar to the fixed WRR LB.

Results

Expected Results

Simulation Results

Above: fixed weight vs RL LB

Above: RL vs random LB weights

Above: RL vs random LB weights smoothened to show average behavior The summary graph of the study is shown above.

There are 4 Load balancers being tested:

1. LB with 50-50 weight setting (Round Robin Case)—"glowing-terrain" line
2. LB with 80-20 weight setting (Weighted RR)—"giddy-cloud" line 3. LB with 20-80 weight setting (Weighted RR)—"volcanic-hill" line 4. RL-Trained adaptive Load Balancer—"fanciful-bird" line 5. Random weights setting where [50,50], [80,20], [20,80] are set at random It describes the Total Ratio on the Y-axis (defined as total measured HD-satisfied data points count/total data points per step (action taken every step)) versus path behavior changes as per "phases" on the X-axis.

The graph shows a full episode of 15 Steps. 15 steps are subdivided into 3 phases:

1. phase 1: Path1—set to HD behavior and Path2 to HD behavior (step 1-5)
2. phase 2: Path1—set to SD behavior and Path2 to HD behavior (step 6-10)
3. phase 3: Path1—set to HD behavior and Path2 to SD behavior (step 11-15)

Conclusions
- Non RL based LBs work well only when path behavior is favorable to them, i.e., WRR with weights 80/20 works well only during phase 1 (path 1-HD, path 2-HD) or phase 3 (path 1-HD, path 2-SD) and suffer when a non-favorable condition occurs i.e., WRR 80-20 suffers during phase 2 (path 1-SD, path2-HD)
- RL based learnt policy adaptively changes weights as per measured state. RL based LB works well throughout the phase changes.
- RL based policy LB, suffers at boundary of the phase change. i.e., at step 6, end of phase 1, the measured state is from the previous phase. The action taken at the edge hence will get bad reward, but RL recovers the very next step.
- RL based LB works better in changing path behaviors on average than a fixed set Further Application Slice Details As mentioned earlier, a new opportunity has arisen from the development of the 'Service Mesh' (like Istio) and 'Network Service Mesh (NSM)' constructs originating from the development of Kubernetes and microservices and other technologies under the umbrella of 'Cloud Native Computing'. These technologies have enabled multi-cloud distributed applications with Kubernetes microservices clusters deployed across multiple public clouds, edge clouds and customer premise private clouds. It is now possible to create an application overlay infrastructure that interconnects distributed application clusters/Pods across domains. These application specific overlays can now have tight binding between application and its overlay network. Applications can now specify the exact connectivity and QOS requirements required for the application. This allows application developers to build and deploy application overlay networks that support application driven traffic engineering/steering with network-level QOS on the underlying infrastructure.

In accordance with certain embodiments and disclosed herein is an "Application Slice"—a key feature introduced by the Avesha Smart Application Mesh (abbr. "Avesha Mesh")—a scalable inter-domain Kubernetes application infrastructure platform that is designed to optimize the distributed multi-cloud, multi edge-cloud Kubernetes application deployments. The platform allows operators to build application slices—application overlays—that are a way of grouping application pods based on one or more organizing principles such as velocity of deployment, security, governance, etc.

Figure 11:
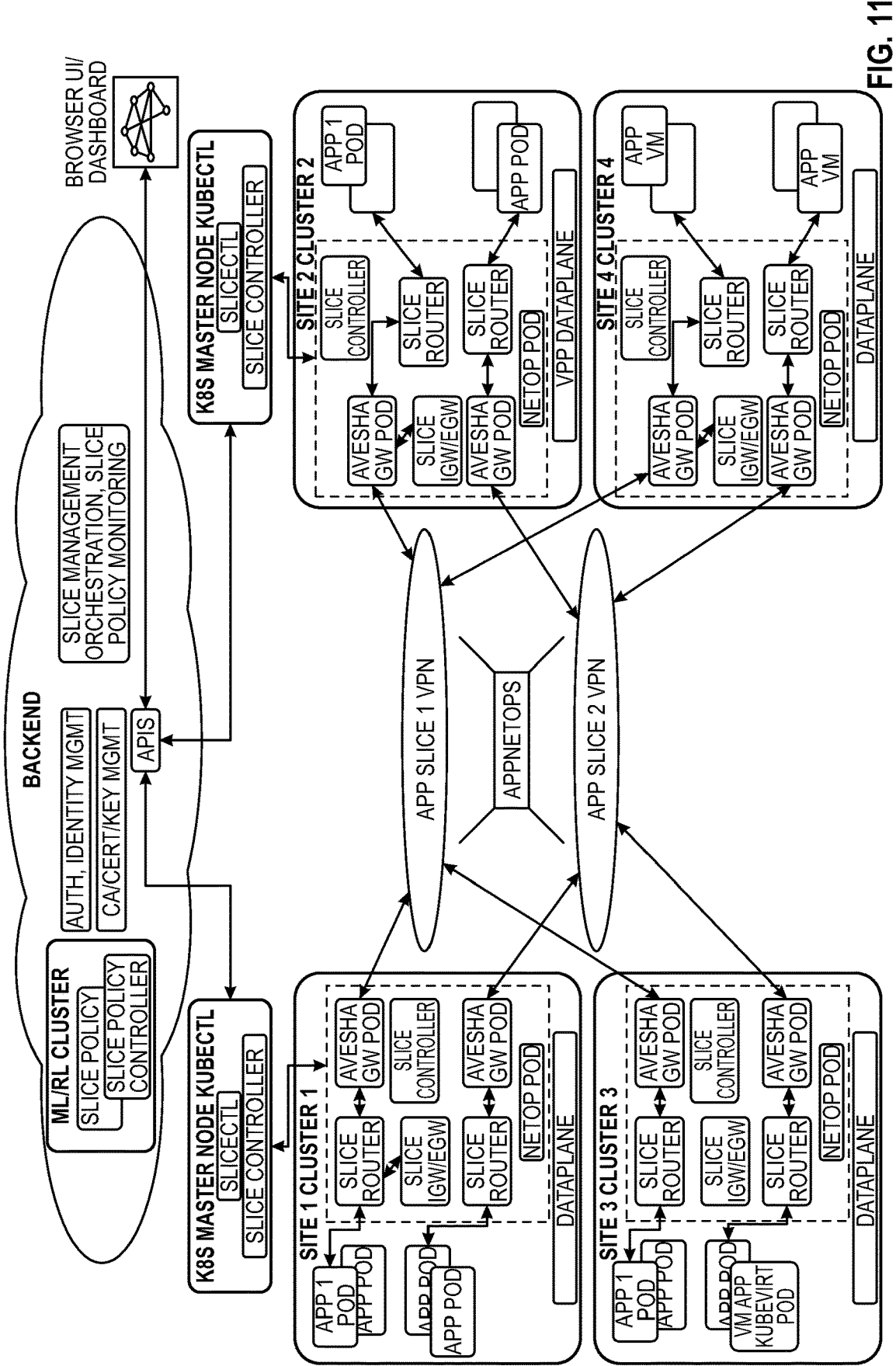
FIG. 11 is a diagram of certain application slice details in accordance with certain embodiments.

FIG. 11 shows a view 1100 of certain application slice details in accordance with certain embodiments. The view 1100 includes multiple application slices within a portion of the application environment 100 (also see FIG. 1).

Application Slice

An Application Slice is an application overlay infrastructure consists of network services across multiple clusters to provide a surface area with its own L3 domain and IP address space. Application Slices may extend over multiple clusters that are deployed in one or more public/private clouds or data centers/edges. The Application Slice mechanism provides a framework for scalable secure segmentation of pods that allows traffic prioritization, security isolation, service discovery for service-2-service communication across the Slice, granular governance and failover containment. In addition, this mechanism enables granular application performance using AI/ML algorithms and AI driven AppNetOps. Finally, an Application Slice is considered as an "overlay" because it works with existing K8S deployments and does not require any significant change to existing code—only an annotation needs to be added to a Pod spec to enable its inclusion into an Application Slice.

Discover and Orchestrate Application Slice

During an application deployment—discovers network services using slice namespace; and connect inter-domain secure overlay links (VPN etc.) to build a distributed applications specific application overlay network slice.

Slice Namespace

The slice namespace is an association of application slice wide L3 network namespace and one or more Kubernetes cluster namespaces with the slice. Slice namespace provides a slice specific namespace associations for all the services on the application slice to be associated with. All the services that are deployed on the slice across all the clusters will be associated with the slice namespace associations and are discovered across the slice. The services that are registered with the application slice namespace can be looked up by any of the services on the application slice. The Slice Operators (or Slice Controllers) in all the slice associated clusters coordinate to normalize the slice namespace across the clusters. They also monitor and enforce the slice namespace associations within the slice. Any application/service to be deployed on the slice has to be in one of the associated namespaces of the slice. These services will not be visible or accessible outside of the slice (unless exception rules are applied). The slice namespace provides isolation of services to application slice. Slice network policies can be associated with namespaces that are associated with the slice namespace. These slice network policies provide isolation of traffic and traffic control within the slice and between slice and the other cluster resources.

Federated Security

The Application Slice offers a very important feature—federated security—that automates the creation of Secure Overlay Links (SOL)—VPNs/VPCs or other wide area secure interconnection technologies, applying global security policies and removes the burden of the security management from the operational staff and further improves the overall security of the network through automation.

AIOps on Application Slice

During application runtime—ingests telemetry from the overlay network services to ML/RL agents; RL agents provide assistance to tune the overlay network services parameters to optimize the distributed application performance.

Application Slice features at a glance
  Slice across multiple attached clusters
    Slice for per application or per set of applications
    Separate L3 domain per Slice
    Secure slice
  Slice Traffic Management
    Traffic Control—Bandwidth control
    QOS profiles
    Slice Priorities
    HTB (token bucket) and DSCP code based prioritization
    Traffic Segmentation
  slice-gateways specific to application slice
    carries only its application inter-domain traffic
  Namespace driven
    Application Pods connect to its Slice or Slice gateway using network service name (slice name)
  Provides AIOPs mechanisms for:
    tuning—global load balancers, local load balancers
    tuning—resource schedulers
    selecting edge resource
    path selection for source routed paths
  Secure Inter-domain connectivity
  per slice namespace
  per slice inter-domain cluster connectivity
  per slice secure VPN
Avesha Mesh Cluster Components
  ISTIO Service mesh, Service discovery support Service Discovery across the slice
  Service-2-Service communication across the Slice
    Service Export/Import, SD export/import policies
  Dataplane
    Slice traffic is carried over NSM Dataplane (VPP/Kernel forwarder)
    CNI agnostic
  Slice and Slice Policy management
  GitOps/Helm Charts support
  Declarative methods for Slice management
  Backend APIs
  UI driven workflows
  Observability
  UI Slice dashboards to explore the services, traffic and health status
Avesha Mesh Cloud Control Plane
  Avesha Mesh Control Plane
    Application Overlay Network Slice
      Multi-tenancy
      Topology map
      Performance objectives
    Network Service Mesh Control Plane
      network service registration and discovery
    Identity management control plane for the inter-domain connectivity
    Service Mesh Interconnect
      ISTIO interconnect
  Avesha Mesh AI/ML/RL Cloud Control Plane
    Application Overlay Network Slice, application overlay network map, discovery
    ML/RL Ray Clusters for Application Overlay Network
    RL Agents for the overlay network
    AIOps for Application Overlay Network—performance optimization
    AIOps for global load balancer, local load balancers
    AIOps for global traffic engineering/steering, Path Compute Engine
Avesha Mesh K8S Cluster/Application Support
  Avesha GW POD for the cluster gateway services
  Avesha GW Services Control Plane Services
  Avesha GW Services Dataplane Services
  Network Services
    Avesha GW POD Network Services
      VPN/mTLS/SSL, VRF, Network Security
      Load Balancer network services
      Envoy Proxy
    Stats export to ELK/Datadog for RL Agents
    Stats export to ELK/Datadog for Avesha Mesh monitoring/observation/notification
    Inter-domain cluster connectivity using NSM control plane
      Via Avesha GW POD and NSM sequences
    Secure Overlay Link (SOL) connections between GW PODs
    POD to POD virtual Secure Overlay Link (vSOL) tunnels
      Secure GRE tunnels as extensions from GW POD to application POD
    NSM namespace in K8S application namespace
      Tight coupling of application to network requirements
    Identity management for GW POD and application PODs
      PODs that are part of the overlay network
  Misc. Support
    Multi-tenant—supports multi-tenant distributed applications (microservices) across K8S clusters in multiple clouds, multiple edge clouds/locations, on-prem locations. Each application overlay network slice is associated with a tenant.
    Independent of underlay network
    Simplify service-to-service networking interconnect
    Per Application Network slice, policy
    Global load balancing (for cost, latency, performance, or service distribution)
    Machine Learning automatically adjust as conditions change
    Works with common open source tools
      ServiceMeshs<istio, linkerd, consul>, NSM, OpenVPN Avesha mesh system components include the network service mesh Control plane and Dataplane components to create and manage the Application Slice L3 overlay network. These components include the network service manager, network service Dataplane daemons, network service registry, forwarders and Webhooks management functions. Network service mesh control plane enables the automation of orchestration of Slice connectivity between the Slice network service clients (Application Pods) and Slice network services like Slice Routers.

Slice Operator

In accordance with certain embodiments, the Slice Operator (or Slice Controller) may be a Kubernetes Operator component that manages the life-cycle of Application Slices related custom CRDs. It helps to manage the Application Slices with a declarative management support for GitOps based workflows. Avesha provides a SliceCtl tool to manage the Slice CRD resources. Application Slices CRDs can be managed using KubeCtl as well.

Reconciles Slice resources in the cluster and with Avesha Backend
  Creates Slice components needed for Slice VPN Gateway connectivity, Slice Service Discovery and Slice Policy
  Auto insertion/deletion of the Slice components to accommodate slice cluster topology changes
  Interacts with Slice components for Config/Status updates
  Interacts with the Backend to manage the life-cycle of the Slices, Slice Config, Slice Status, Slice Telemetry and Slice Policy
  Interacts with the Backend to facilitate Service Discovery across the Slice Interacts with the Backend to Export Istio Services labelled for export to other clusters attached to the Slice Interacts with the Backend to Import Istio Services from other clusters attached to the Slice Interacts with Backend for RBAC for managing the Slice Components Supports most of the Slice and Slice Policy resource management using GitOps workflows and declarative management.

SliceCtl

In accordance with certain embodiments, SliceCtl is an Avesha CLI tool to interact with Slice Operator and manage Slices and Slice related resources on the cluster. Some of the SliceCtl commands:

slicectl Login
slicectl attach slice
slicectl detach slice
slicectl delete slice
slicectl create slice-vpn-gw Slice VPN Gateway Slice VPN Gateway is a slice network service component that provides a secure VPN link connection endpoint for the Slice on a cluster. A pair of Slice VPN Gateways are deployed to connect every pair of clusters attached to a Slice. A VPN Gateway connects to a remote VPN Gateway in a remote cluster. Slice Operator manages the life-cycle of the Slice VPN Gateways. Slice Operator deploys and manages the config and keys/certs for the operation of the Slice VPN Gateways. Slice Operator interacts with Backend to get the Slice Config and auto inserts the Slice components like VPN Gateways and Slice Routers for the Slice. Slice Operator constantly interacts with Slice VPN Gateways for status, keys/certs and config changes. Backend manages the VPN gateway pairs for slice attached clusters, creates the keys and configuration for the operation.

Slice Overlay Network

Each Slice has its own IP L3 domain (subnet /16) and each cluster that is attached to the slice gets a part of the subnet (/24). Slice VPN Gateways connect to Slice Router network service to provide the access to connected remote cluster.

Slice Traffic Control

Slice VPN Gateways are the exit/entry points for all the traffic to/from the Applications Pods on the Slice to its remote cluster Slice VPN Gateways. Slice VPN Gateways are configured with Traffic Control (TC) Policies (with a QOS profile) to manage the traffic shaping for the slice. Slice TC on VPN Gateways support marking the packets with DSCP/COS code points to provide prioritization of the Slice traffic.

Slice Router

Slice Router is a slice network service (VL3 NSE) component that provides a virtual L3 IP switching functionality for the slice. Each Slice in a cluster has one Slice Router component with the possibility of a redundant pair option. Slice Operator manages the life-cycle of the Slice Router. Slice Operator deploys, configures and continuously monitors/manages the Slice Router component for the Slice. All the Slice components and Application Pods of the cluster on the Slice connect to Slice Router. Slice Router provides the connectivity to rest of the Slice components, which are Applications across the clusters.

When an Application Pod connects to the Slice (as a network service client NSC) on a cluster the Slice Router manages the establishment of the Slice Interface (NSM interface) on the Application Pod—done automatically via injection into the Pod. The Application Pods use this Slice Interface to communicate with the other Applications/Network Services (local or remote) on the Slice. Slice Router manages the IPAM/routes for the Slice cluster applications/components.

Slice Istio Components

Avesha Mesh works with Istio service mesh components in a cluster. If Istio is deployed on a cluster it uses Istio ingress/egress gateway resources to create Slice Ingress/Egress Gateways. These Slice Ingress/Egress Gateways can be manually deployed or auto deployed as part of the Slice. Slice Ingress/Egress Gateways can be deployed for E/W traffic Slice Egress/Ingress Gateways can be used to export/import Slice connected application services across the Slice clusters. A Slice Ingress Gateway can be used to export the services from a Slice cluster. A Slice Egress Cluster can be used to import the slice services from remote Slice clusters. Slice Service Discovery uses the Slice Ingress/Egress Gateways to export/import the application services across the Slice clusters. Deployment of the Slice Ingress/Egress Gateways on a Slice is optional.

Avesha Backend

Avesha Backend provides management, visualization, dashboard functions and APIs to manage the life-cycle of the Slice and Slice Policy deployment across multiple-clusters.

Avesha Backend provides:

Slice management functions and APIs
  provides APIs for Avesha UI Slice Management
  handles the management of encrypted resources, keys, etc. needed for Slice VPN gateways
  interacts with the Slice Operators in the clusters for management of Slice and Slice resources
  Slice config, status and telemetry, etc.

User/Operators management
  User roles and responsibilities, RBP/RBAC management
  define roles and responsibilities for Slice management Slice Policy management functions and APIs
  provides APIs for Avesha UI and Slice Policy Operator and ML/RL cluster Slice Policy Functions
  interacts with Slice Operator for Slice Telemetry and Slice Enforcement Points for Slice Policy enforcement—to apply the Slice Policy actions to enforcement points on the clusters.

Avesha UI

Avesha UI, is a web interface to manage the Avesha Mesh across multiple clusters. Avesha UI can be used for Slice and Slice Policy management. Slice dashboards provides observability into the Slice operations—slice network services, application services deployed on the Slice across multiple clusters. It allows users to view and explore the Slice services topology, slice service discovery data, traffic, latency and real time health status.

Deploying Application Slice across Multiple Clusters

Avesha Mesh allows users to create and manage Application Slices across multiple clusters. Based on the RBP user can be Cluster Admin, Slice Admin, Application TL, Developer, etc. Avesha Mesh allows multiple ways to create and deploy the Slices—UI, Helm Charts/GitOps and Backend APIs.

Prerequisites

The following may be prerequisites in accordance with certain embodiments. Along these lines, before deploying a Slice on a cluster, the following tasks should be completed.

Create K8S clusters, config and deploy Istio

Deploy Avesha Mesh System and Slice Operator components

Identify and label a node in the cluster as Avesha Gateway Node

Install Slice over Multiple Clusters

There are multiple ways to create a Slice and attach clusters to the Slice.

1. Helm chart: Users can specify the slice parameters as values and apply slice helm chart. Slice Operator will use these parameters and create Slice by interacting with the Backend. Additionally, the same cluster will be attached to the Slice. Same helm chart can be applied to multiple clusters, the Slice will be created from the first cluster and all the rest of the clusters will be attached into the Slice.

2.

Avesha UI: From Avesha UI for the corresponding environment, Users can create the slice by specifying all the parameters. Users can then use SliceCtl or helm charts to attach the clusters to Slice.

3.

Backend API: The backend API can be used to create a Slice and attach clusters to the Slice.

For deletion of Slice,

1. Avesha UI: Slice can be deleted using Avesha UI.

2.

Backend API: Slice can be deleted with the Backend API

3.

SliceCtl: The command slicectl delete slice [slice-name] will delete the named Slice. 4. Helm Chart: Slice can be deleted by uninstalling the helm chart used to deploy the Slice. When a Slice is deleted using any of the above methods, it will be detached from all the clusters. It will delete corresponding Slice network services and resources from the clusters.

Deploying Applications Over Application Slice

Users can deploy the Application Services (App Pods) on to the Slice on a cluster to access other Application Services that are deployed on the Slice in other attached clusters. Slice provides the network connectivity and service discovery to enable service-2-service communication. Users can deploy the Application Service on to a Slice using various steps.

While various embodiments of the present disclosure have been particularly shown and described, it will be understood by those skilled in the art that various changes in form and details may be made therein without departing from the spirit and scope of the present disclosure as defined by the appended claims.

Along these lines and as explained above, it should be understood that the application environment 100 is well suited for both applications that use a microservices architecture as well as monolithic applications. Accordingly, the clusters 110 may take any scale (e.g., data centers, cloud platforms, individual server devices, etc.). Such modifications and enhancements are intended to belong to various embodiments of the disclosure.

What is claimed is:

1. A method of managing cluster resources within an application environment, the method comprising:
identifying a group of cluster resources from a plurality of cluster resources of the application environment, the plurality of cluster resources being constructed and arranged to provide a plurality of services;
forming an application slice having the group of cluster resources; and
deploying the application slice to provide services,
wherein deploying the application slice to provide the services includes, after forming the application slice, deploying application services on to the application slice,
wherein deploying the application slice to provide the services further includes providing a slice namespace for application services deployed on the slice,
and wherein the slice namespace provides slice-specific namespace associations for all services on the application slice to be associated with, and the services registered with the application slice namespace are looked up by any of the services on the application slice.

2. The method as in claim 1 wherein forming the application slice includes:
providing respective applications specific overlay network components at the cluster resources of the group to provide network connectivity between the cluster resources of the group.

3. The method as in claim 2 wherein the group of cluster resources includes first cluster resources that provide a first service and second cluster resources that provide a second service that is different from the first service; and
wherein forming the application slice further includes:
configuring the respective applications specific overlay network components at the cluster resources of the group to provide inter-cluster communications among the first cluster resources and the second cluster resources over a private address space to provide traffic isolation and control.

4. The method as in claim 2 wherein the group of cluster resources includes first cluster resources that provide a same service; and
wherein forming the application slice further includes:
configuring the respective applications specific overlay network components at the cluster resources of the group to provide inter-cluster communications among the first cluster resources that provide the same service.

5. The method as in claim 2 wherein the group of cluster resources includes a first cluster resource that provides a first service and a second cluster resource that provides a second service that is different from the first service; and
wherein forming the application slice further includes:
configuring the respective applications specific overlay network components at the cluster resources of the group to provide inter-cluster communications between the first cluster resource and the second cluster resource.

6. The method as in claim 1 wherein identifying the group of cluster resources from the plurality of cluster resources of the application environment includes:
receiving a set of organization parameters for the application, and
based on the set of organization parameters for the application, choosing the group of cluster resources from the plurality of cluster resources of the application environment.

7. The method as in claim 6 wherein choosing the group of cluster resources from the plurality of cluster resources of the application environment includes:
selecting the cluster resources among the plurality of cluster resources of the application environment based on a set of quality of service criteria.

8. The method as in claim 6 wherein choosing the group of cluster resources from the plurality of cluster resources of the application environment includes:
selecting the cluster resources among the plurality of cluster resources of the application environment based on a set of velocity of deployment criteria, a set of security criteria, and a set of governance criteria.

9. The method as in claim 1, further comprising:
identifying another group of cluster resources from the plurality of cluster resources of the application environment;
forming another application slice having the other group of cluster resources; and deploying the other application slice to provide other services.

10. The method as in claim 9 wherein the application slice and the other application slice belong to an application mesh which overlays a microservices mesh; and wherein the method further comprises:
providing a web interface which supports user input/output to impose control over at least portions of both the application mesh and the microservices mesh.

11. The method as in claim 10 wherein the group of cluster resources and the other group of cluster resources have at least one cluster resource in common.

12. The method as in claim 10 wherein the group of cluster resources has at least one cluster resource that is not in common with the other group of cluster resources.

13. The method as in claim 10 wherein the group of cluster resources and the other group of cluster resources have at least one cluster resource in common; and wherein the group of cluster resources has at least one cluster resource that is not in common with the other group of cluster resources.

14. The method as in claim 1 wherein deploying the application slice to provide the services further includes:
performing a service discovery operation in the slice namespace to enable service-to-service communications among the deployed application services.

15. The method as in claim 1 wherein deploying the application slice to provide the services includes:
performing a single sign-on authentication operation with a slice controller to authenticate a service request source constructed and arranged to provide the service requests to the application slice.

16. The method as in claim 15 wherein deploying the application slice to provide the services further includes:
after performing a successful single sign-on authentication operation with the slice controller, applying a global set of security policies that imposes federated security over the application slice during application runtime.

17. The method as in claim 1 wherein forming the application slice includes:
configuring respective slice control components for the cluster resources of the group, the respective slice control components being constructed and arranged to manage a life-cycle of the application slice.

18. Electronic circuitry, comprising:
memory; and
control circuitry coupled to the memory, the memory storing instructions which, when carried out by the control circuitry, cause the control circuitry to perform a method of:
identifying a group of cluster resources from a plurality of cluster resources of an application environment, the plurality of cluster resources being constructed and arranged to provide a plurality of services,
forming an application slice having the group of cluster resources, and
deploying the application slice to provide services,
wherein deploying the application slice to provide the services includes, after forming the application slice, deploying application services on to the application slice,
wherein deploying the application slice to provide the services further includes providing a slice namespace for application services deployed on the slice, and wherein the slice namespace provides slice-specific namespace associations for all services on the application slice to be associated with, and the services registered with the application slice namespace are looked up by any of the services on the application slice.

19. A computer program product having a non-transitory computer readable medium which stores a set of instructions to manage cluster resources within an application environment; the set of instructions, when carried out by computerized circuitry, causing the computerized circuitry to perform a method of:
identifying a group of cluster resources from a plurality of cluster resources of the application environment, the plurality of cluster resources being constructed and arranged to provide a plurality of services;
forming an application slice having the group of cluster resources; and
deploying the application slice to provide services,
wherein deploying the application slice to provide the services includes, after forming the application slice, deploying application services on to the application slice,
wherein deploying the application slice to provide the services further includes providing a slice namespace for application services deployed on the slice,
and wherein the slice namespace provides slice-specific namespace associations for all services on the application slice to be associated with, and the services registered with the application slice namespace are looked up by any of the services on the application slice.

20. The method as in claim 1 wherein the cluster resources include application pods, and wherein the application slices are application overlays that group application pods based on one or more organizing principles.

21. The method as in claim 20 wherein the organizing principles are selected from at least velocity of deployment, security, and governance.

22. The method as in claim 1, wherein slice operators in slice-associated clusters coordinate to normalize the slice namespace across multiple clusters, and also monitor and enforce the slice namespace associations within the application slice, such that any application or service deployed on the slice is in one of the associated slice namespaces of the slice, and the application or service is not visible or accessible outside of the slice unless one or more exception rules is applied.

23. Electronic circuitry as in claim 18 wherein forming the application slice includes:
providing respective applications specific overlay network components at the cluster resources of the group to provide network connectivity between the cluster resources of the group.

24. Electronic circuitry as in claim 23 wherein the group of cluster resources includes first cluster resources that provide a first service and second cluster resources that provide a second service that is different from the first service; and
wherein forming the application slice further includes:
configuring the respective applications specific overlay network components at the cluster resources of the group to provide inter-cluster communications among the first cluster resources and the second cluster resources over a private address space to provide traffic isolation and control.

25. Electronic circuitry as in claim 23 wherein the group of cluster resources includes first cluster resources that provide a same service; and wherein forming the application slice further includes:
configuring the respective applications specific overlay network components at the cluster resources of the group to provide inter-cluster communications among the first cluster resources that provide the same service.

26. Electronic circuitry as in claim 23 wherein the group of cluster resources includes a first cluster resource that provides a first service and a second cluster resource that provides a second service that is different from the first service; and
wherein forming the application slice further includes:
configuring the respective applications specific overlay network components at the cluster resources of the group to provide inter-cluster communications between the first cluster resource and the second cluster resource.

27. Electronic circuitry as in claim 18 wherein identifying the group of cluster resources from the plurality of cluster resources of the application environment includes:
receiving a set of organization parameters for the application, and
based on the set of organization parameters for the application, choosing the group of cluster resources from the plurality of cluster resources of the application environment.

* * * * *